Figure 1:
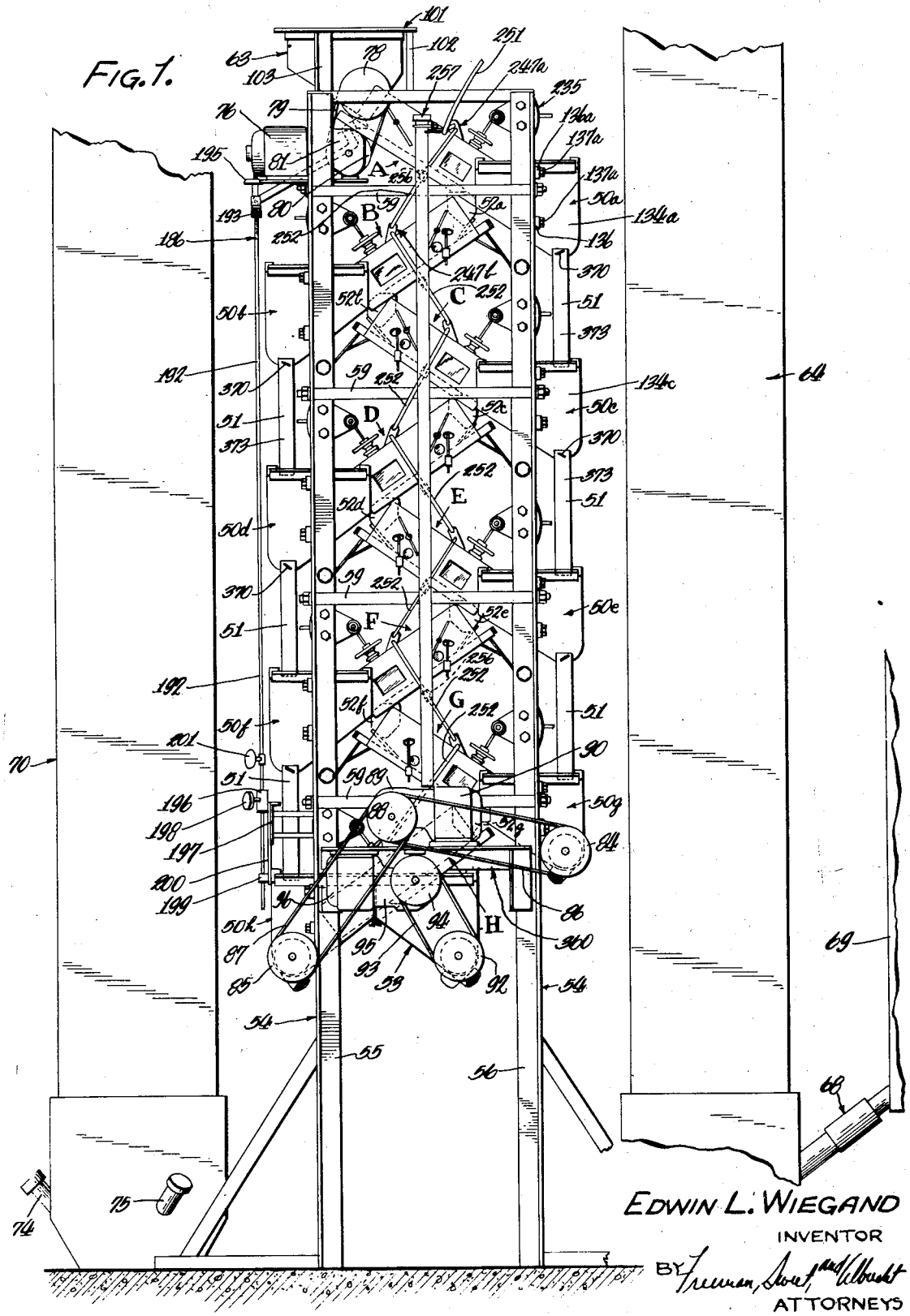

Aug. 14, 1945.   E. L. WIEGAND   2,382,122
APPARATUS FOR THE ELECTROSTATIC SEPARATION OF MATERIAL PARTICLES
Filed July 21, 1941   12 Sheets-Sheet 1

Edwin L. Wiegand
INVENTOR
ATTORNEYS

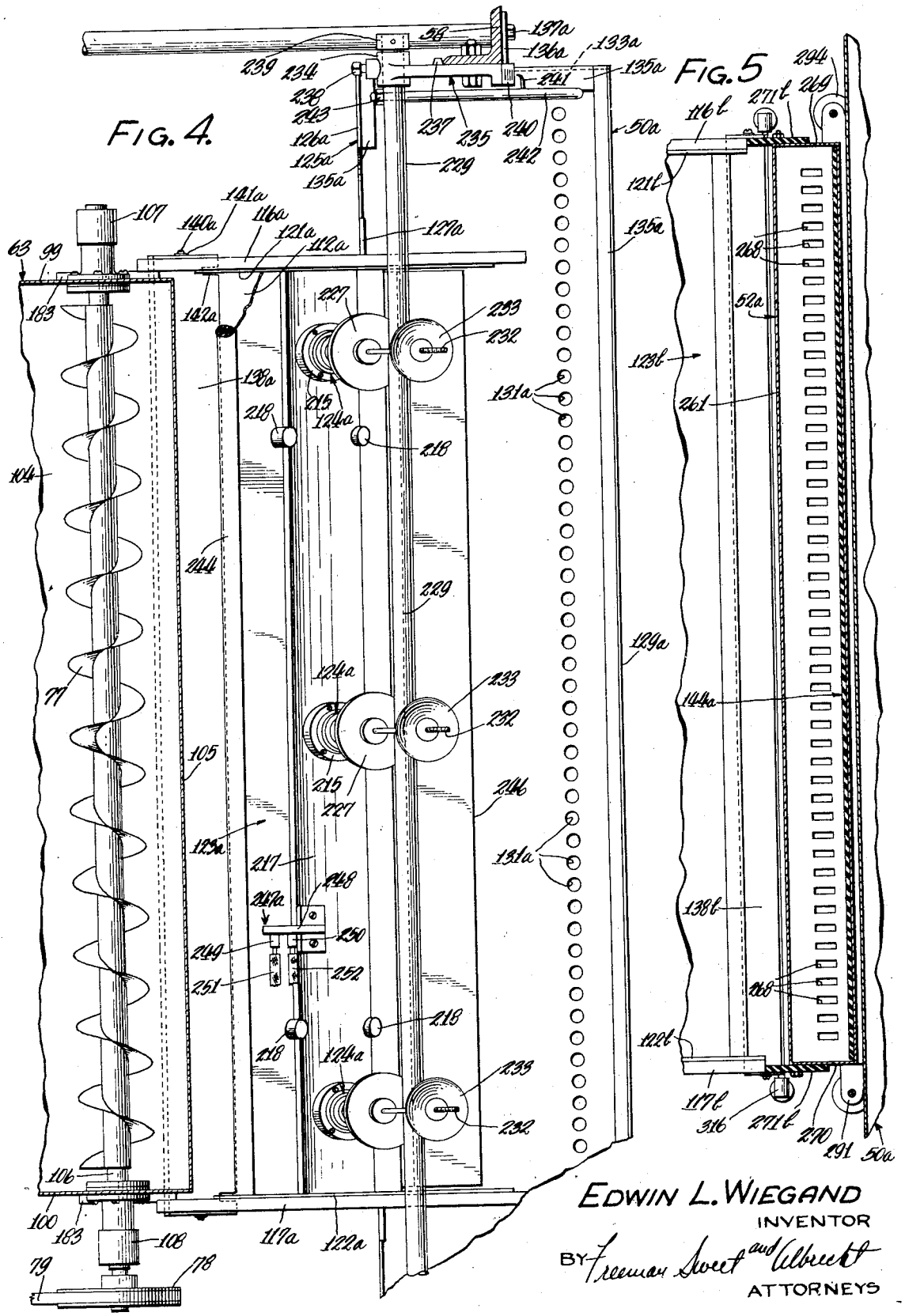

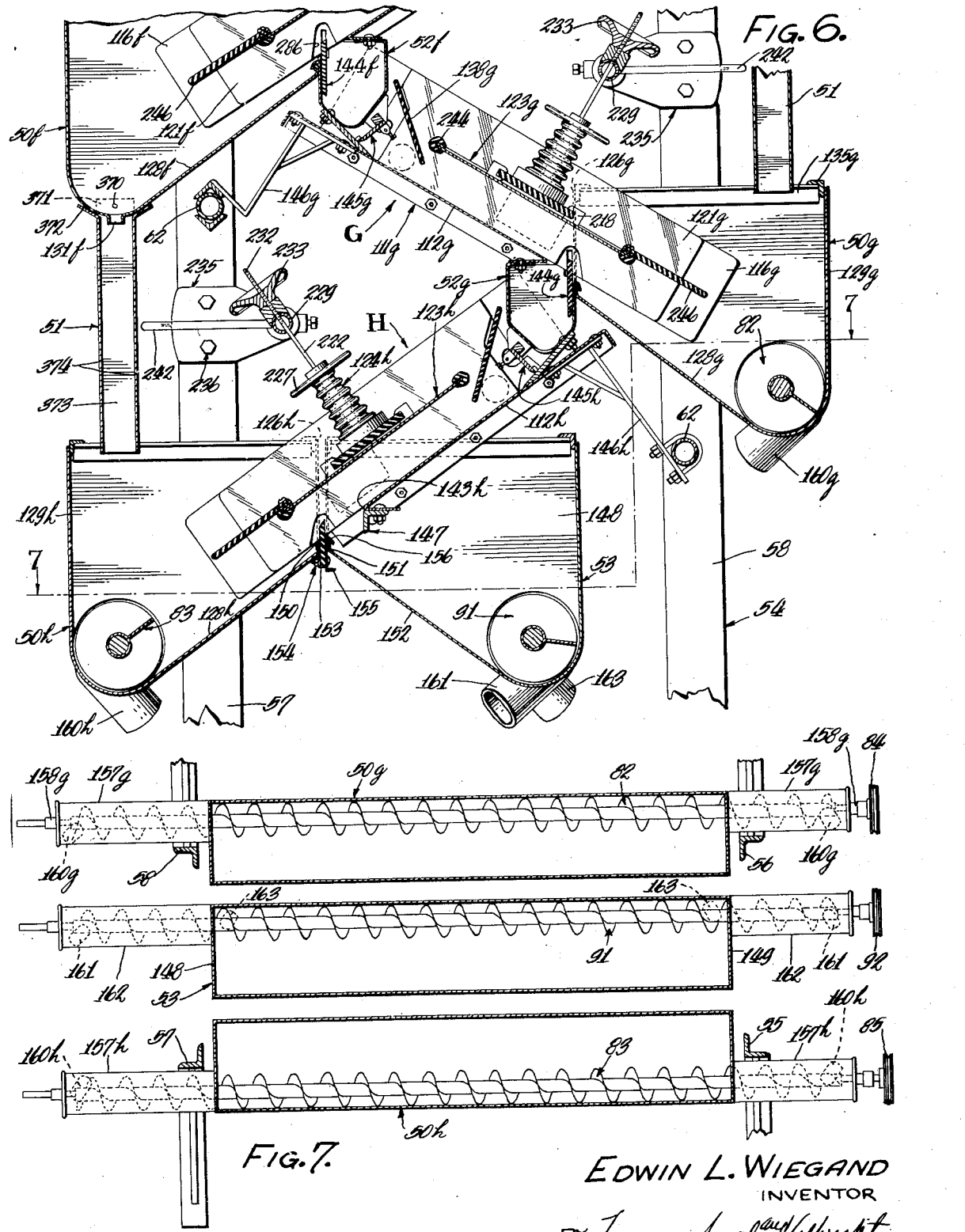

Aug. 14, 1945.  E. L. WIEGAND  2,382,122
APPARATUS FOR THE ELECTROSTATIC SEPARATION OF MATERIAL PARTICLES
Filed July 21, 1941  12 Sheets-Sheet 6
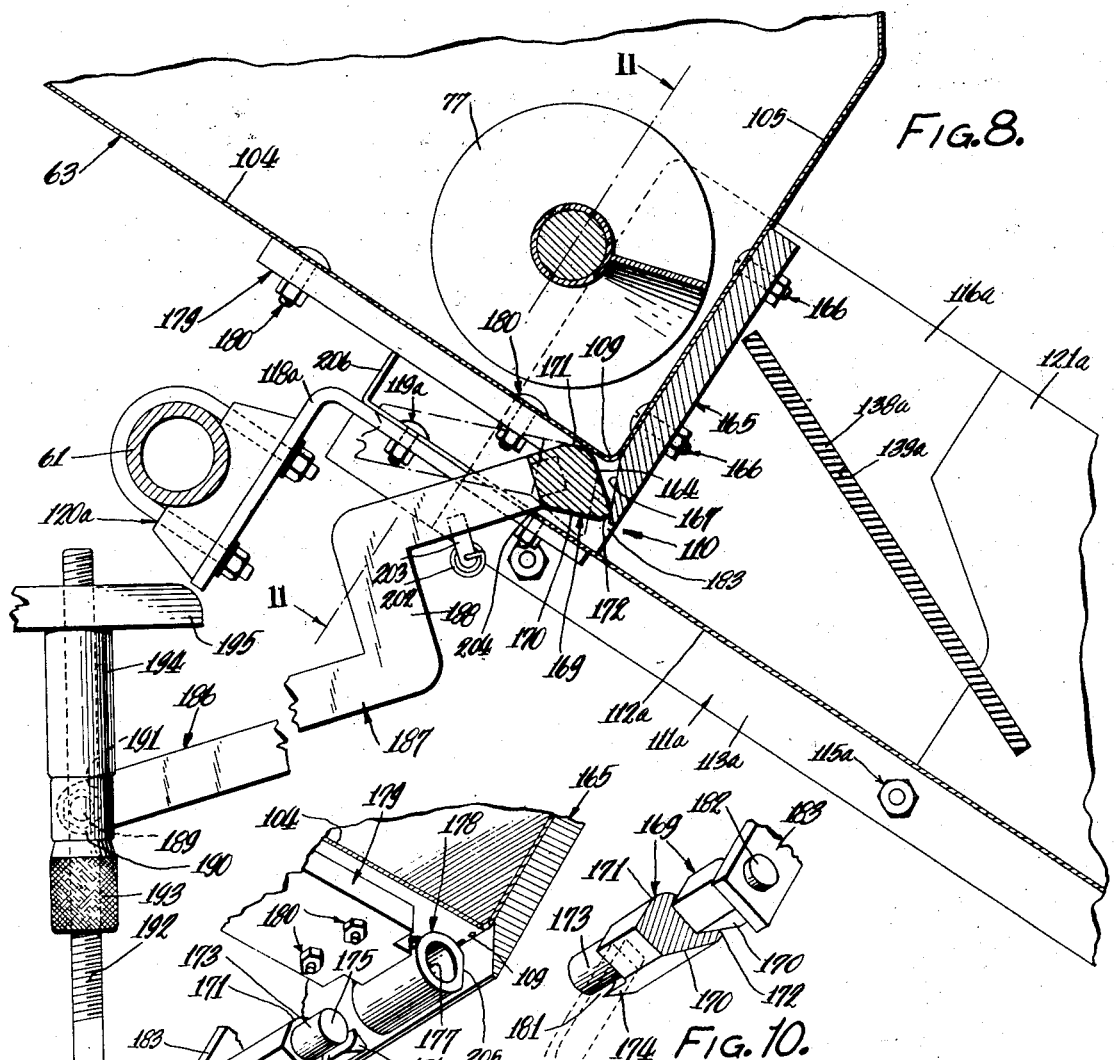
EDWIN L. WIEGAND
INVENTOR
BY
ATTORNEYS

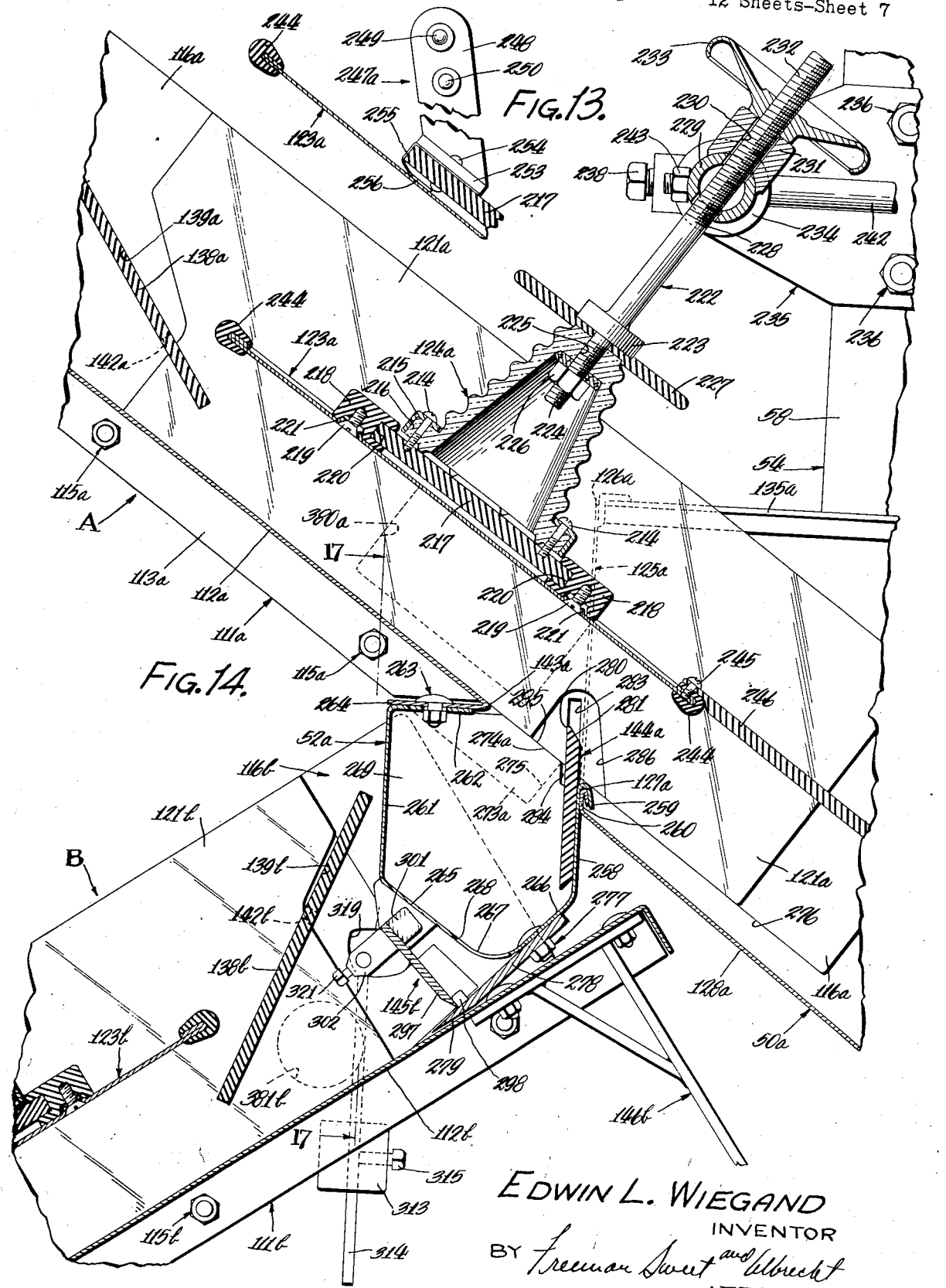

Aug. 14, 1945.   E. L. WIEGAND   2,382,122
APPARATUS FOR THE ELECTROSTATIC SEPARATION OF MATERIAL PARTICLES
Filed July 21, 1941   12 Sheets-Sheet 8
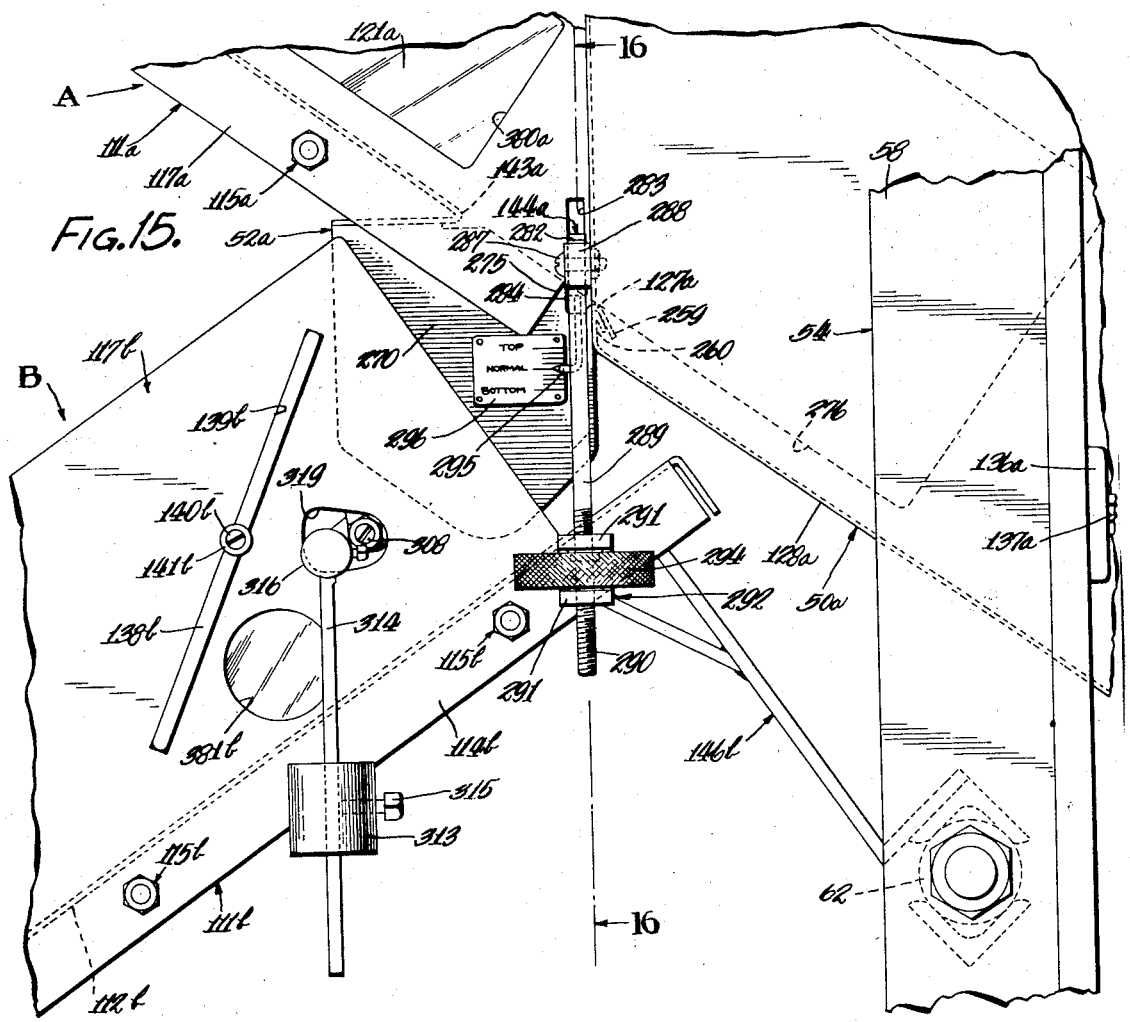
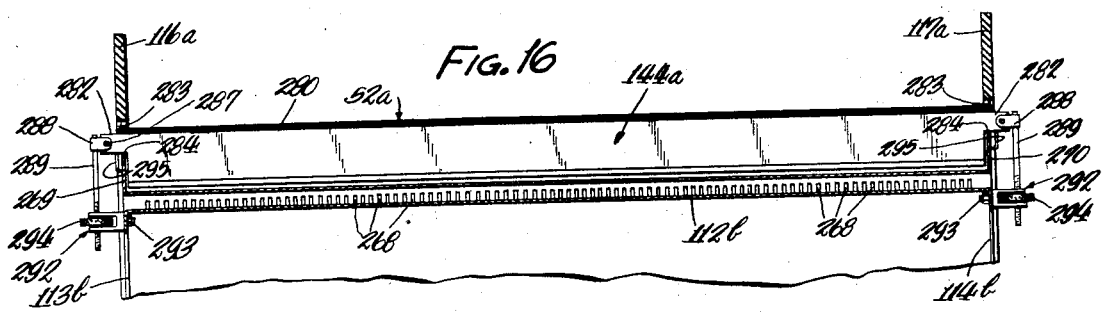
Edwin L. Wiegand
INVENTOR
BY Freeman Sweet and Albrecht
ATTORNEYS Aug. 14, 1945.        E. L. WIEGAND        2,382,122
APPARATUS FOR THE ELECTROSTATIC SEPARATION OF MATERIAL PARTICLES
Filed July 21, 1941        12 Sheets-Sheet 9
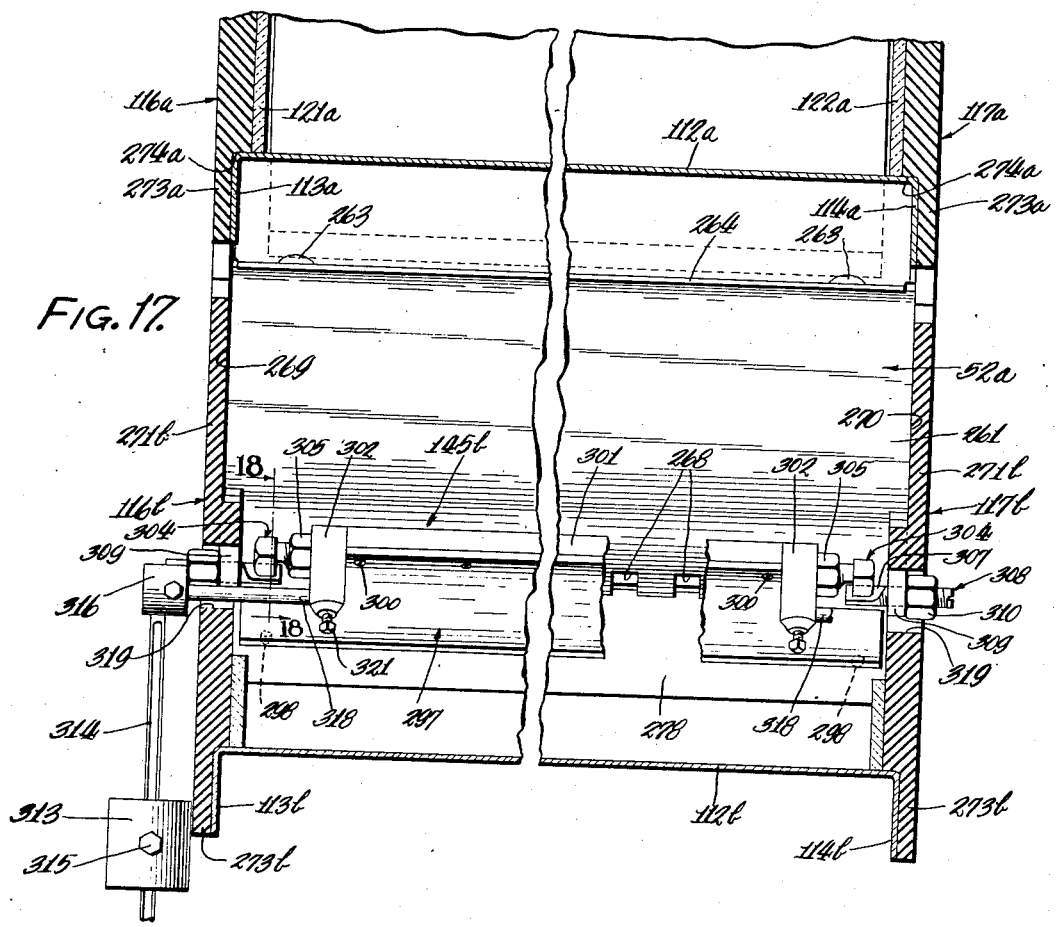
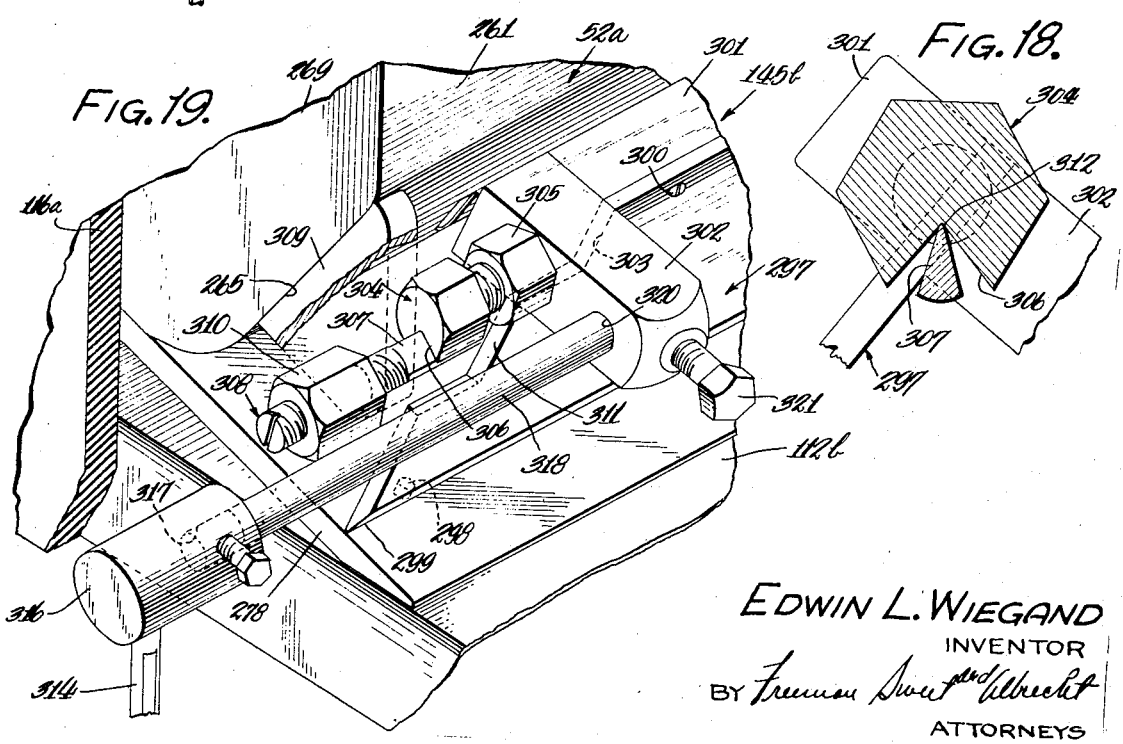
EDWIN L. WIEGAND
INVENTOR
ATTORNEYS

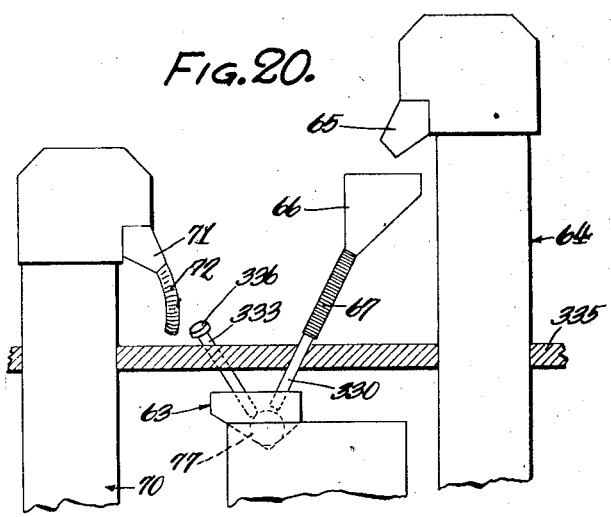
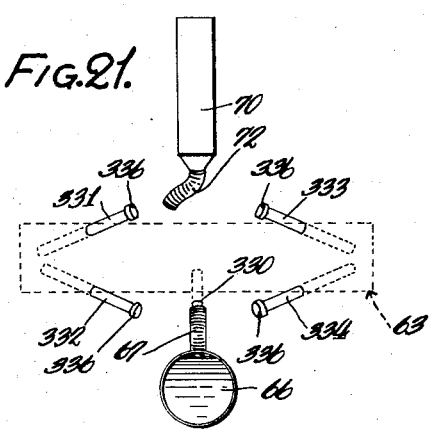
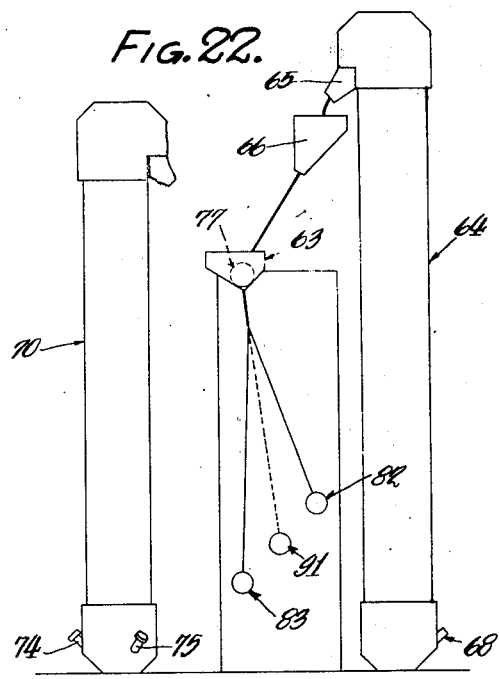
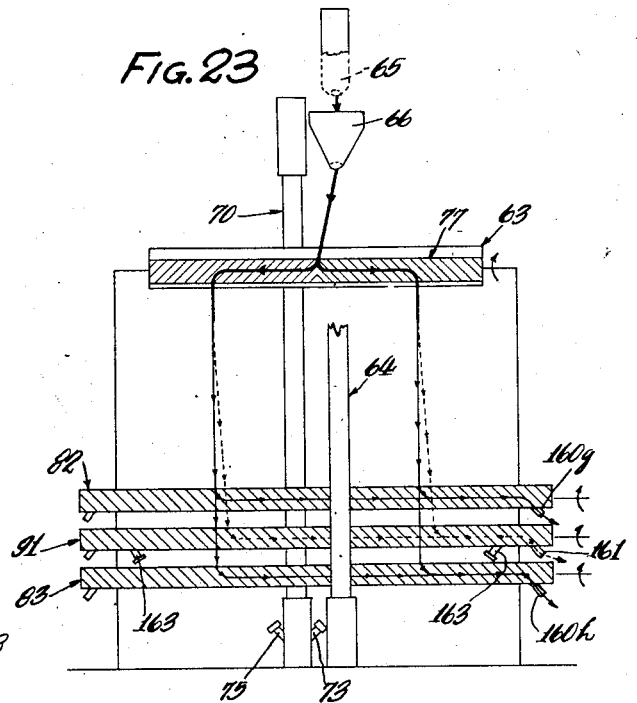

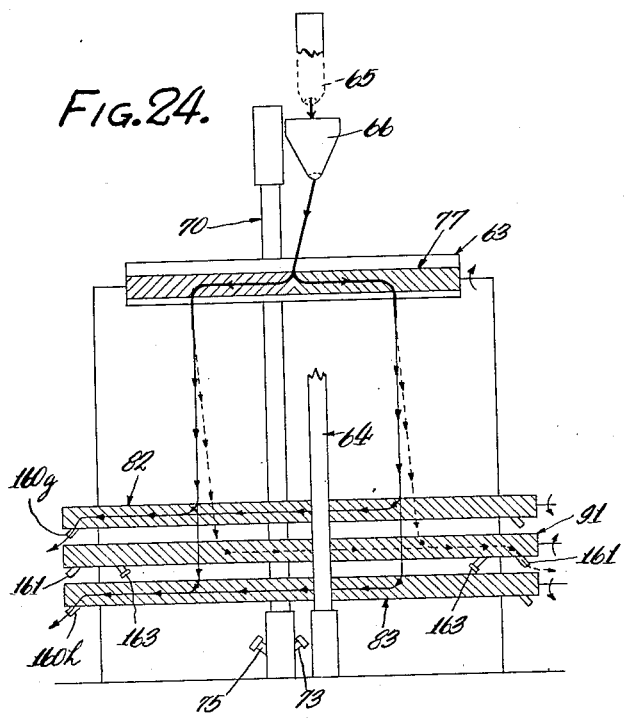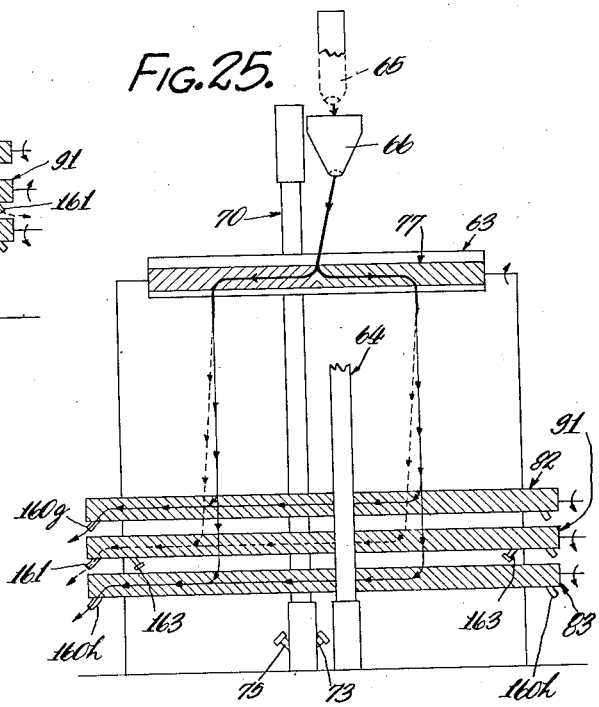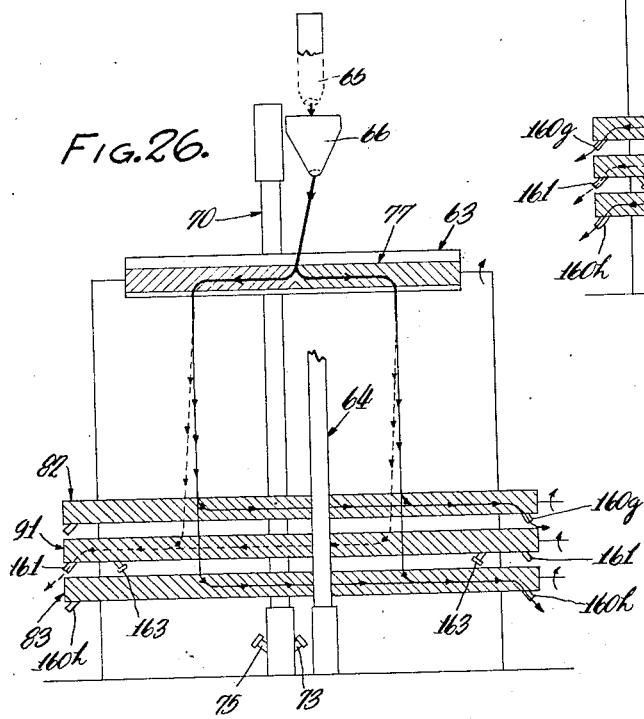

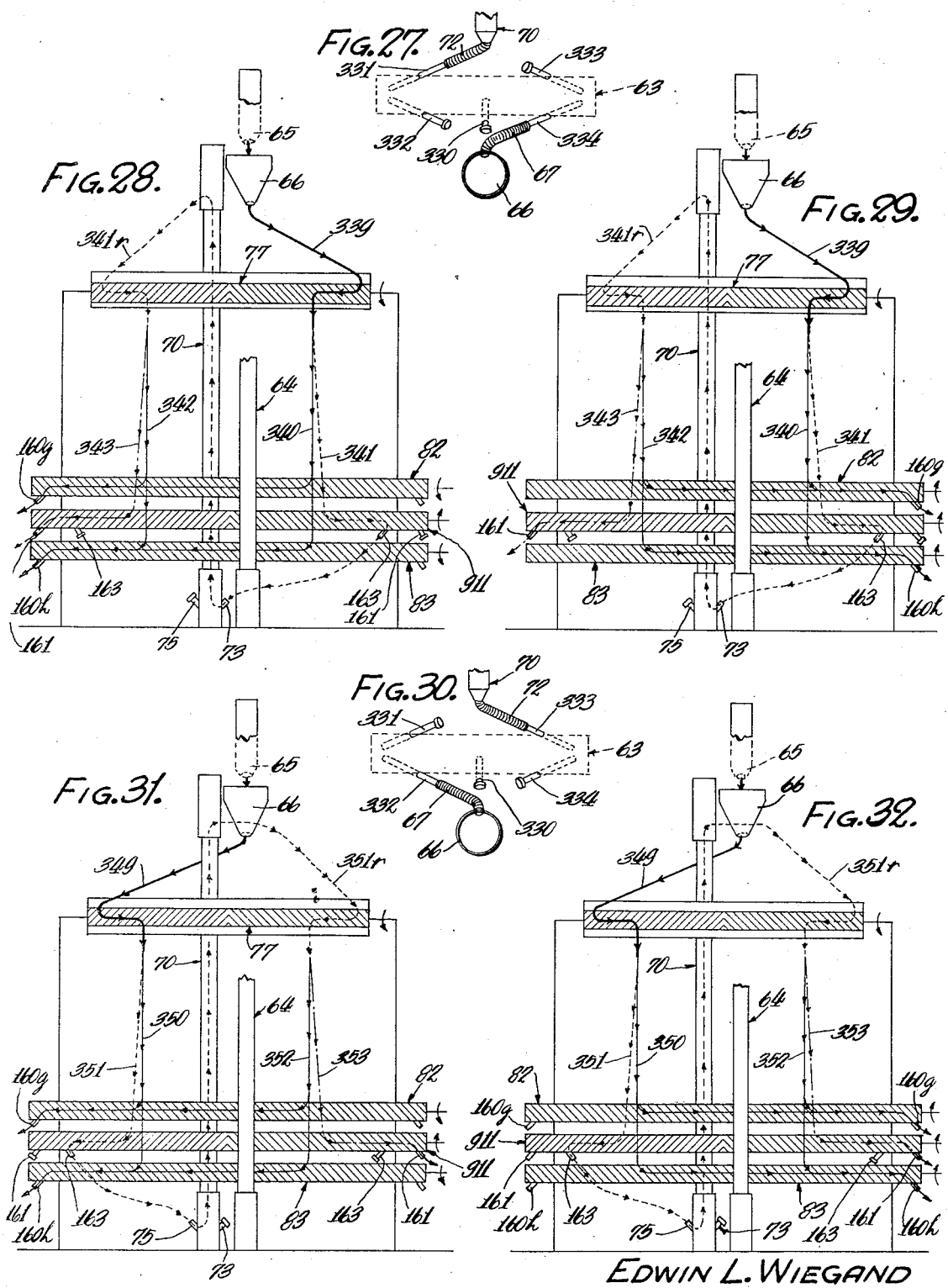

Patented Aug. 14, 1945

2,382,122

UNITED STATES PATENT OFFICE 2,382,122

APPARATUS FOR THE ELECTROSTATIC SEPARATION OF MATERIAL PARTICLES

Edwin L. Wiegand, Pittsburgh, Pa., assignor to Orefraction Incorporated, Pittsburgh, Pa., a corporation of Pennsylvania Application July 21, 1941, Serial No. 403,267

16 Claims. (Cl. 209—127)

My invention relates to electrostatic separation of material particles, and the principal object of my invention is to provide new and improved apparatus for electrostatically separating material particles.

Figure 2:
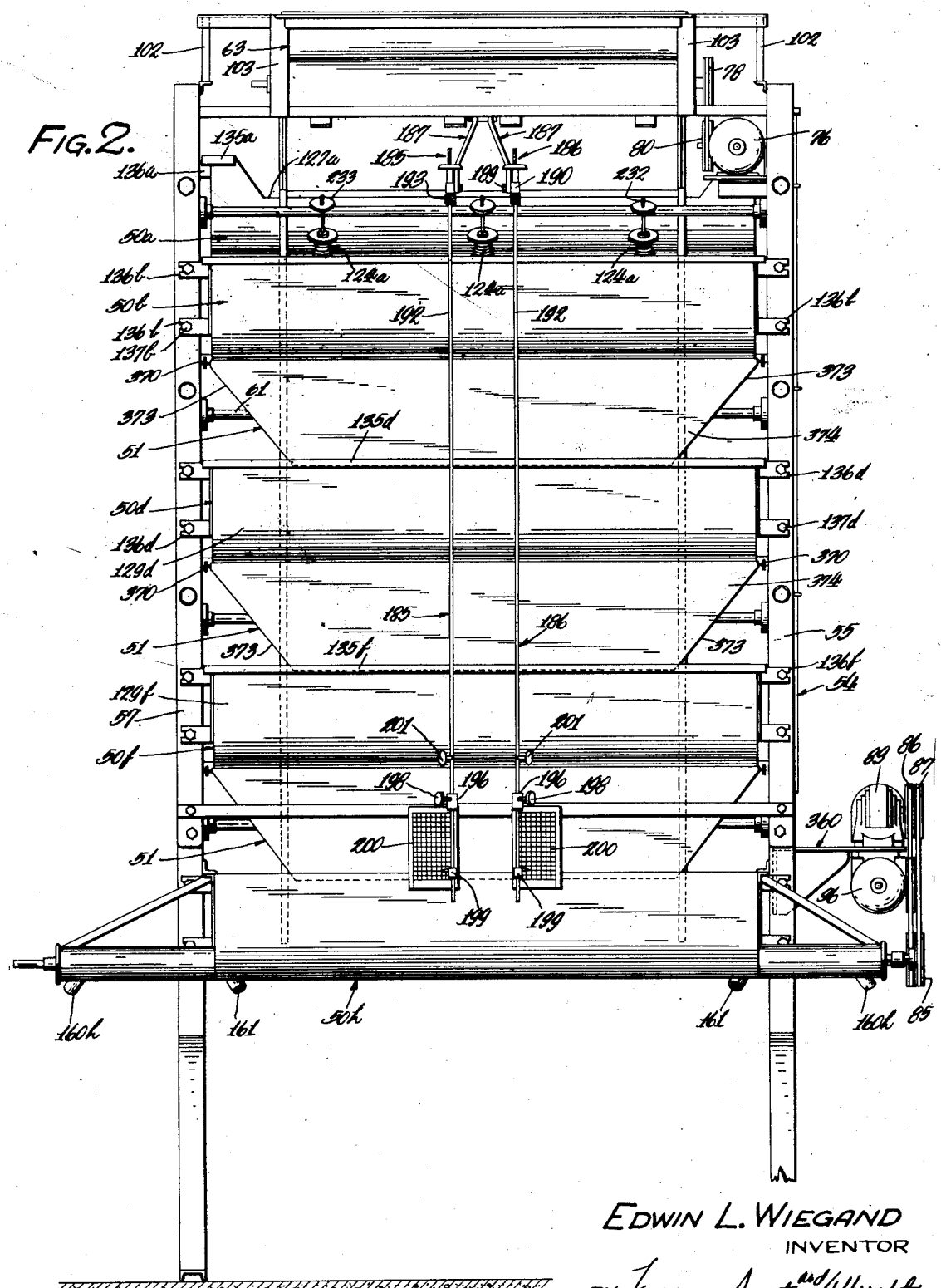
Figure 3:
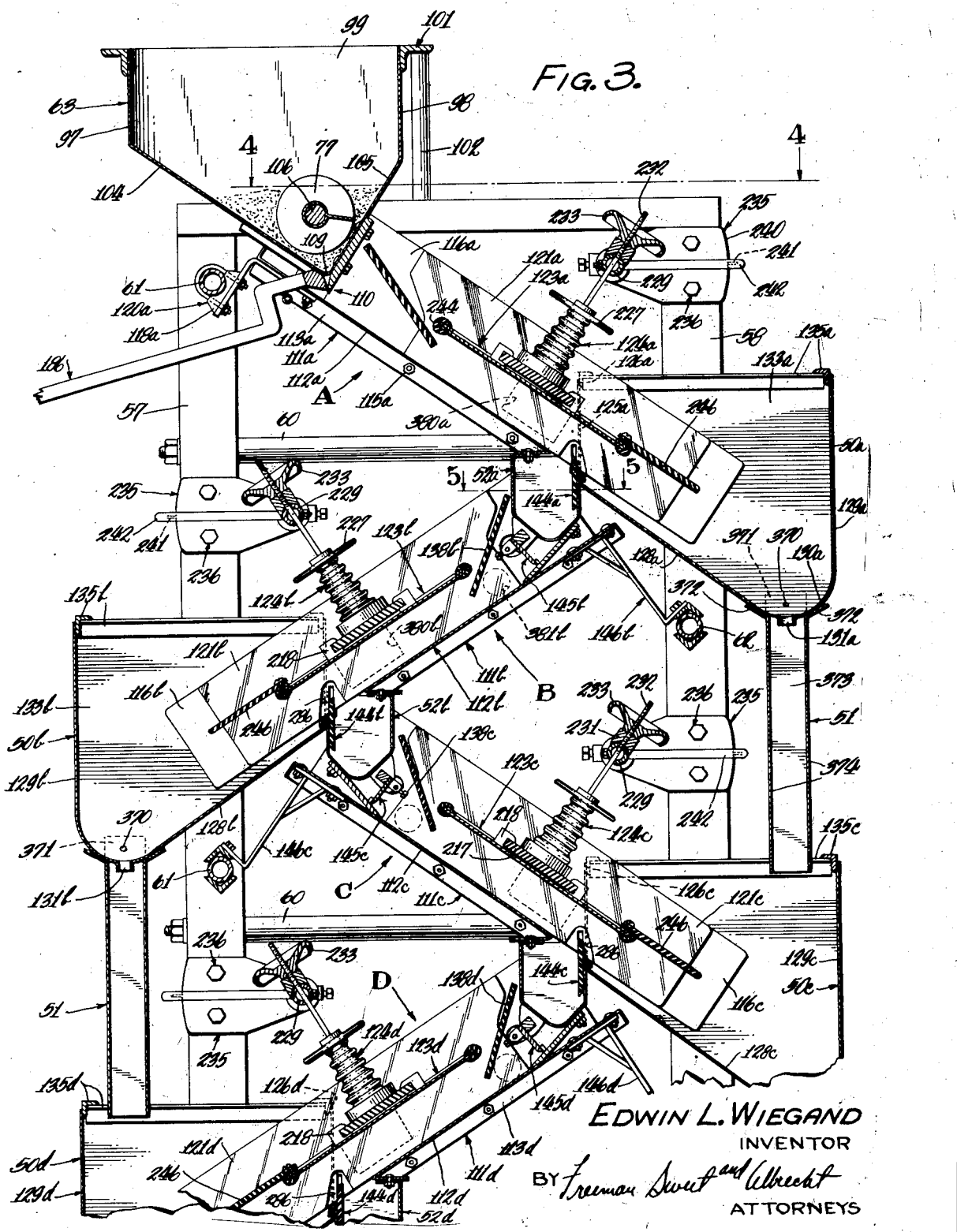

In the drawings accompanying this specification, and forming a part of this application, I have shown, for purposes of illustration, forms which my invention may assume, and in these drawings:

Figure 1 is an end elevation of apparatus embodying my invention and certain auxiliary apparatus fragmentarily shown, Figure 2 is a rear elevation of the apparatus shown in Figure 1, Figure 3 is a vertical sectional fragmentary enlarged view of an upper portion of the apparatus shown in Figure 1, Figure 4 is a fragmentary partly sectional view taken on the line 4—4 of Figure 3, looking in the direction of the arrows, Figure 5 is a fragmentary sectional view taken on the line 5—5 of Figure 3, looking in the direction of the arrows, Figure 6 is a vertical sectional fragmentary enlarged view of a lower portion of the apparatus shown in Figure 1, Figure 7 is a section taken on the line 7—7 of Figure 6, Figure 8 is a vertical sectional fragmentary view, on an enlarged scale, of detail parts including a feed hopper and a feed gate or valve, the section being taken on the line 8—8 of Figure 11, Figure 9 is a fragmentary perspective view, partly in section, showing certain parts of the feed valve, disassembled, Figure 10 is a fragmentary perspective view, partly in section, showing certain other parts of the feed valve, Figure 11 is a fragmentary sectional view taken on the line 11—11 of Figure 8, Figure 11 being on a smaller scale, Figure 12 is a fragmentary sectional enlarged view taken on the line 12—12 of Figure 11, Figure 13 is a fragmentary sectional view of a detail, Figure 14 is a fragmentary view of a portion of Figure 3, enlarged, Figure 15 is a fragmentary elevational view of certain details, Figure 16 is a fragmentary sectional view, on a reduced scale, taken on the line 16—16 of Figure 15, Figure 17 is a fragmentary sectional broken view taken on the line 17—17 of Figure 14, and showing an intermediate valve or gate, Figure 18 is a sectional view taken on the line 18—18 of Figure 17, Figure 19 is a fragmentary perspective enlarged view, partly in section, including parts of the intermediate valve or gate shown in Figure 17, Figure 20 is a fragmentary and elevational view showing more or less diagrammatically the feed hopper of the apparatus of Figure 1, along with means for feeding material to the hopper, Figure 21 is a fragmentary plan view showing feed conduits for the feed hopper and one way of feeding material to the hopper, Figure 22 is an end elevational diagrammatic view of the flow of material to the feed hopper and from the feed hopper into the separating apparatus, corresponding to the feed arrangement shown in Figure 21, Figures 23, 24, 25, and 26 are flow diagrams showing various ways in which the material may flow through the separating apparatus when the feed hopper is fed as shown in Figures 21 and 22.

Figure 27 is a view corresponding to Figure 21 but showing a different way of feeding material to the feed hopper of the separating apparatus, Figures 28 and 29 are flow diagrams showing several ways in which the material may flow through the separating apparatus when the feed hopper is fed as shown in Figure 27, Figure 30 is a view corresponding to Figure 21 but showing a different way of feeding material to the feed hopper of the separating apparatus, and Figures 31 and 32 are flow diagrams showing several ways in which the material may flow through the separating apparatus when the feed hopper is fed as shown in Figure 30.

Referring to the drawings and to the apparatus as a whole, the separating apparatus herein shown is adapted for the purpose of passing the particles to be treated through at least one electrostatic treating zone, one or more times, or successively through a plurality of electrostatic treating zones one or more times, whereby the particles are separated into two fractions one of which may be termed the heads and the other the tails. The significance of the terms heads and tails is in one sense arbitrary, the term heads being usually used to designate the desired or most desired fraction and the term tails the least desired or perhaps undesired fraction, but in many instances each fraction is useful for some purpose. Moreover, it will be apparent that if the fraction comprising the most susceptible particles happens to be most desired this fraction may be called the heads whereas if the fraction comprising the least susceptible or non-susceptible particles happens to be the most desired this fraction may be called the heads. However, merely for the sake of brevity and convenience in describing the disclosed apparatus that fraction comprising the susceptible or most susceptible particles will be termed herein the tails.

The apparatus herein shown comprises eight treating zones, designated A to H inclusive, but the invention is not limited to any particular number of zones. Each treating zone is adapted to remove some electrostatically susceptible particles from the stream of particles in the respective zone. The particles removed in the zones A, C, E, and G are adapted to be segregated in receptacle means comprising tails hoppers at the "front" of the apparatus, these hoppers being designated by the numeral 50 with letter suffixes to correspond to the treating zones, whereas the particles removed from the zones B, D, F, and H are adapted to be segregated in tails hoppers, at the "rear" of the apparatus, likewise designated with the numeral 50 and letter suffixes. Chutes 51 may be provided leading from each "front" tails hopper to the next lower hopper, so that the lowermost front tails hopper 50g receives not only the tails from the treating zone G but the tails from all of the preceding hoppers in the front series. In like manner chutes 51 may be provided so that the lowermost rear tails hopper 50h receives not only the tails from the treating zone H but from all of the preceding hoppers in the rear series.

Interposed between the zone A and the zone B is an intermediate hopper 52a adapted to receive all material from the zone A not discharged into the tails hopper 50a, the material from the intermediate hopper 52a being adapted to be fed into the zone B. As far as the zone A is concerned the material in the intermediate hopper may be termed heads, or, in the illustrated apparatus, intermediate heads. In like manner intermediate hoppers are interposed between each successive pair of the other treating zones, these intermediate hoppers being designated by the numeral 52 plus a letter suffix corresponding to the zone from which the intermediate hopper receives "heads," and all of the intermediate hoppers may be of identical construction.

The heads from the lowermost treating zone, H, are discharged into a final or main heads hopper 53.

The parts of the separating apparatus may be carried on a supporting frame 54 comprising four vertical angle bar standards, one pair of standards 55, 56 being at one end of the apparatus and another pair of standards 57, 58 being at the other end. The standards 55, 56, and 57, 58, and 55, 57, and 56, 58 are respectively interconnected by cross braces 59, 60, 61, 62.

Suitably mounted on the upper end of the supporting frame 54 is a feed hopper 63 adapted to feed material to be treated to the first treating zone A. In the embodiment shown material may be fed to the feed hopper 63 from an elevator 64 diagrammatically indicated in Figures 1 and 20, and in this particular embodiment there is shown interposed between the spout 65 of the elevator 64 (see Figure 20) and the feed hopper 63 an auxiliary hopper 66 from which material may be fed to the feed hopper 63 through conduit means 67 in various ways as will more fully appear. The elevator 64 may receive material to be treated through conduit means 68 from a bin 69 fragmentarily indicated in Figure 1.

An elevator 70 may also be provided, to the spout 71 of which may be connected a conduit 72 to feed material to the hopper 63 in ways to be described. The elevator 70 is provided with inlet spuds 73, 74, 75 to a selected one of which material may be fed under certain circumstances as will appear.

A reversible electric motor 76 suitably mounted on the frame 54 is provided for rotating a feed screw 77 (Figures 3 and 4) which may be utilized in the feed hopper 63 for suitably distributing the material in the bottom of the hopper. The feed screw 77 may be driven by a sheave 78 on the shaft of the screw 77 by means of a belt 79 cooperating with a sheave 80 on a speed reducing means 81 driven by the motor 76.

The tails hoppers 50g and 50h also may be provided with feed screws 82, 83 respectively (Figure 6). The feed screws 82, 83 may be driven by sheaves 84, 85 on the respective shafts of the feed screws 82, 83, by means of belts 86, 87 cooperating with a sheave 88 on a speed reducing means 89 driven by a reversible electric motor 90 suitably mounted on the frame 54 as by a support platform 360.

The heads hopper 53 also may be provided with a feed screw 91 (Figure 6) which may be driven by a sheave 92 on the shaft of the feed screw 91 by means of a belt 93 cooperating with a sheave 94 on a speed reducing means 95 driven by a reversible electric motor 96 suitably mounted on the platform 360.

Referring now more particularly to Figures 3 and 4, the feed hopper 63 is here shown as of horizontally elongated form. The hopper 63 is open at the top and has vertical side walls 97, 98 and end walls 99, 100 provided with a frame 101 at their upper margins, the frame 101 being suitably supported, as by a plurality of standards 102, 103 from the top of the main supporting frame 54. The feed hopper 63 has a bottom wall 104 disposed at an angle to the horizontal greater than the angle of repose of the material to be treated, and a bottom wall 105 approximately at right angles to the wall 104. The feed screw 77 is disposed in the angle formed by the walls 104, 105, and the shaft 106 of the feed screw is journaled in bearings 107, 108 supported by the end walls 99, 100. The feed screw 77 is here shown as left handed for one-half its length and right handed for the other half of its length.

Material is adapted to be discharged through a series of holes 109 in the bottom of the feed hopper 63, thence through feed valve means 110, as will more fully be described. The material discharged through the valve means 110 is received on the bottom of a chute 111a forming part of the treating zone A. The chute 111a comprises a metallic bottom plate 112a here also serving as an electrode. The plate 112a extends downwardly at an angle to the horizontal greater than the angle of repose of the material particles. The longitudinal ends of the plate 112a are bent downwardly so as to form flanges 113a, 114a (see also Figure 17) to which are respectively fastened, as by bolts and nuts 115a, plates 116a, 117a of "Micarta" or other suitable insulating material, these plates forming the outer side walls of the chute 111a. The side walls 116a, 117a are here shown as spaced from and slightly overlapping the end walls 99, 100 of the feed hopper 63. Cemented or otherwise suitably fastened to inside surfaces of the side walls 116a, 117a are plates 121a, 122a of glass or other suitable material which serve as a lining for the side walls. The plates 121a, 122a need not cover the entire length of the side walls 116a, 117a.

Disposed above the plate 112a is a plate electrode 123a supported by a plurality of insulators 124a as will more fully appear. Ordinarily, but not necessarily, the electrode 123a will be positively charged and the plate 112a grounded by reason of its connection with the frame 54, so that, for the sake of brevity, the electrode 123a and the plate 112a may be hereinafter referred to as positive electrode and negative electrode respectively.

The upper end of the chute 111a is supported by a plurality of angle brackets 118a (see also Figure 8) which may be fastened by bolts and nuts 119a to the plate 112a and by U-bolt clamps 120a to one of the cross braces 61.

The tails hopper 50a has a vertical wall 125a most of the length of which is recessed or cut away from its top margin 126a down to a margin 127a. This margin 127a is approximately common with the upper margin of a bottom wall 128a of the tails hopper 50a. The wall 128a, in this instance, extends upwardly at an angle to the horizontal about the same as the plate 112a but the plane of the bottom wall 128a is here shown slightly below the plane of the plate 112a. The tails hopper 50a has another vertical wall 129a extending from the top of the hopper downwardly and merging with a rounded bottom wall portion 130a provided with a plurality of apertures 131a through which tails may be discharged into the associated chute 51 and thence to the next lower tails hopper 50c. The tails hopper 50a has vertical end walls 133a, 134a. The uppermost margins of the walls of the tails hopper have angle bars 135a suitably fastened thereto and comprise part of a frame to make the hopper more rigid and for supporting the hopper. For the latter purpose the frame has ears 136a fastened by screw bolts 137a to the angle bar standards 58, 56.

The chute 51 is here shown as hung onto the tails hopper 50a by pins or screws 370 extending through ears 371 into or through the respective end walls 133a, 134a of the tails hopper, the ears 371 being upward extensions of the end walls 373 of the chute. The upper ends 372 of the side walls 374 of the chute 51 are flared outwardly and may abut the outside of the bottom wall 130a of the tails hopper. The end walls 373 of the chutes 51 are here shown as slanting inwardly as seen in Figure 2. The chutes 51 are herein shown as all identically constructed.

The length of the margin 127a is somewhat greater than the width of the chute 111a from side wall 116a to side wall 117a and these side walls (but not the plate 112a) extend into the tails hopper. Lower margins of the side walls 116a, 117a may rest on the margin 127a or its equivalent as will more fully appear.

Extending from between the upper margin of the positive electrode 123a upwardly approximately to the feed hopper 63 is an insulating plate 138a the ends of which extend through slots 139a in the side walls 116a, 117a. Screws 140a, bearing against washers 141a larger than the width of the slots 139a, are screwed into the ends of the plate 138a to limit its longitudinal movement. The plate 138a is here shown as provided with transverse slots 142a to accommodate the glass plate 121a. The plate 138a serves as a baffle to prevent particles of material which may move from the negative electrode 112a upwardly in the space under the baffle from getting above the positive electrode 123a.

The negative electrode 112a has a lowermost margin 143a which is spaced from the margin 127a, whereby particles falling through this space may be received in the intermediate receptacle or hopper 52a. Adjacent the margin 127a may be provided adjustable dividing means 144a here shown as comprising an elongated insulating plate, to be further described.

Material from the intermediate hopper 52a may be discharged to the second electrostatic treating zone B which includes a chute 111b comprising a metallic plate electrode 112b, and side walls 116b, 117b, and glass liners 121b, 122b, similar to the chute 111a. As will more fully appear, the feeding of material from the intermediate hopper 52a onto the plate 112b is controllable by valve means 145b. The chute 111b is related to the tails hopper 50b and to the second intermediate hopper 52b in the same way as is the chute 111a of the first treating zone, A, to the tails hopper 50a and the intermediate hopper 52a. The upper end of the plate 112b may be supported by brackets 146b from a cross brace 62.

The zone B includes a positive electrode 123b similar in all respects to the electrode 123a. A baffle 138b, similar in construction and purpose to the baffle 138a, is provided extending from between the upper margin of the electrode 123b upwardly approximately to the nearest side of the intermediate hopper 52a.

The side walls 116a, 117a have apertures 380a, here shown as oblong rectangular, cut therein, thus exposing the glass liners 121a, 122a at these places, in order that, if desired, the action taking place between the electrodes 123a and 112a may be observed. The side walls 116b, 117b, of the zone B, are likewise provided with similar apertures, 380b, and, in addition, are provided with apertures 381b, in this instance circular, here exposing the glass liners 121b, 122b, so that, if desired, the action taking place near the automatic valve means 145b may be observed.

Further description of the subsequent zones, C, D, E, and F is unnecessary as these zones are constructed the same as the zone B, except of course that, as shown, the chutes of successive zones are directed in successively opposite directions.

The zone G (see Figure 6) is similar to the zone B except that the tails hopper 50g associated with the zone G is provided with the feed screw 82. The zone H is similar to the zone G but differs from the zone G in that instead of an intermediate hopper, such as 52g, below the space between the lower discharge margin 143h of the negative electrode 112h and the entrance margin 150 of the tails hopper 50h, there is provided the final heads hopper 53 the construction of which, with certain exceptions, is like that of the tails hopper 50g. The upper margins of the walls of the heads hopper 53 may be provided with a frame similar to the frame 135a and this frame may be supported from the support means 360 (Figure 1) or in any other suitable way. The lower end of the negative electrode 112h may be suitably supported by an angle bar 147 extending across the inside of the heads hopper 53 the ends of the angle bar being supported in any suitable way by the end walls 148, 149 of the heads hopper. Here shown as disposed between the entrance margin 150 of the tails hopper 50h and the upwardly projecting margin 151 of the bottom wall 152 of the heads hopper 53 is a dividing means comprising an insulating plate 153, in this instance fastened by bolts and nuts 154 to a metal plate 155 having a bent-over upper margin 156 hung over the margin 151. If desired the insulating plate 153 may also be made vertically adjustable in any suitable way so that the amount the upper margin of the plate extends above the plane of the negative electrode 112h may be adjusted.

The tails hopper 50g is provided at its bottom with cylindrical extensions 157g (see Figure 7) at both ends, the feed screw 82 extending into these extensions, the ends of the shaft of the feed screw 82 being supported by bearings 158g supported by the ends of the cylindrical extensions. The extensions 157g are provided near their ends with discharge spouts 160g, directed downwardly to the left as viewed in Figure 6 and outwardly as viewed in Figure 7. The spouts 160g may discharge the material into receptacles (not shown) or may have conduits (not shown) connected thereto to lead the discharged material to any desired place. The construction of the tails hopper 50h is the same as the tails hopper 50g but it is arranged reversely to the tails hopper 50g as evident from Figures 6 and 7.

The heads hopper 53 is constructed the same as the tails hopper 50g except that in addition to discharge spouts 161, similar to the spouts 160g, at the ends of cylindrical extensions 162, it has a pair of discharge spouts 163, in this instance communicating with the bottom of the hopper at its respective ends near the end walls 148, 149, the spouts 163 being directed at an angle downwardly in a direction to the right as viewed in Figure 6 and inwardly as viewed in Figure 7. Either selected one of the spouts 161 is adapted to discharge into a receptacle and either selected one of the spouts 163 is under certain conditions adapted to discharge into a conduit (not shown), and selected ones of the spouts in general may be closed by closure caps as will appear.

Referring now more particularly to Figures 8 through 12. At the junction of the walls 104, 105 of the feed hopper 63 are provided the small holes 109 forming a series of holes (see also Figure 11) extending substantially the full length of the hopper, through which material may discharge, this discharge being controllable by the feed valve means 110. The feed valve means 110 comprises a relatively stationary plate 165 fastened by bolts and nuts 166 to the wall 105. The plate 165 has a beveled surface 167 providing a valve seat for, in this instance, two independently operable valve bodies 168, 169. As here shown the valve bodies 168, 169 may be described as made of rectangular section rod stock one corner being beveled off forming a bevel face 170 and the opposite corner being rounded off to form a round face 171. The edge 172 of a surface 164 of each valve body is adapted to engage the bevel face 167, so that, in this instance, when the valve means is closed, the surfaces 164, 167 form a V-shaped particle receiving recess. The inner end of the valve body 168 is provided with a cylindrical pintle 173 (see Figure 9) which may be formed by annularly milling the end of the valve body so as to form the pintle and leave intact a portion 174 coextensive with the pintle, the end faces 175, 176 of the pintle and portion 174 being in such instance in the same plane. The pintle 173 is adapted to be received in one end of a cylindrical hole 177 provided by a bearing member 178 carried by a plate 179 fastened by bolts and nuts 180 to the wall 104. When the pintle 173 of the valve body 168 is inserted in the left hand end of the bearing member 178 the outer and inner walls of the bearing member fit in the arcuate slot 181 between the pintle 173 and the coextensive portion 174. The inner end of the valve body 169 (see Figure 10) is formed analogously to that of the inner end of the valve body 168 so that when the pintle 173 of the valve body 169 is inserted in the right hand end of the bearing member 178 the respective inner end surfaces 175, 176, or at least the surfaces 176, of the valve bodies are in contact. Consequently, when both valve bodies 168, 169 are in the closed position shown in Figure 8 in which the edges 172 of the valve bodies are in contact with the surface 167, these edges will define a continuous line of contact there being no interruption in spite of the presence of the bearing member 178.

The outer ends of the valve bodies 168, 169 are provided with pivot pins 182 respectively cooperating with bearing holes in end bearing plates 183 (see Figures 9, 10, and 11) which are disposed against the stationary valve plate 165 to which the end bearing plates may be fastened as by screw bolts 184 (see Figure 12). The ends of the plate 165 being flush with the end walls 99, 100 of the feed hopper, the plates 183 also bear against these walls respectively, and as here shown the plates 183 extend downwardly to the plate 112a (see Figure 11). The end bearing plate 183 for the valve body 168 thus also serves to close the outer end of the space between the surface 164 of the valve body 168 and the surface 167 of the valve plate 165, so that no leakage of material can occur from the end of that space. In like manner the end bearing plate 183 for the valve body 169 serves to close the outer end of the space between the surface 164 of the valve body 169 and the surface 167 of the valve plate 165.

There being two valve bodies 168, 169 the operating means therefor is in two independently operable parts 185, 186 which are substantially identical so that only one need be described. The valve body 169 has rigidly fastened thereto in any suitable way an arm 187 having an offset portion 188 merely for the purpose of clearing other parts of the apparatus. The outer end of the arm 187 is pivotally connected by a stud 189 (see also Figure 2) to a bushing 190. The bushing 190 has a hole 191 through which freely passes a threaded rod 192. Engageable with the lower end of the bushing 190 is a threaded knurled nut 193, and engageable with the upper end of the bushing is a threaded nut 194 provided with a hand wheel 195. The lower end of the rod 192 is not threaded and is disposed with a sliding fit through a bushing 196 (see Figures 1 and 2) suitably fastened to a support 197 fastened in any suitable way to the frame 54. The bushing 196 has a threaded transverse hole to accommodate a set screw 198 for holding the rod 192 in adjusted position. The lower end of the rod 192 is provided with an indicator 199 which may be adjustably fastened to the rod 192. The indicator 199 cooperates with a chart 200 the ordinates of which indicate predetermined positions of the valve body 169 from closed to fully open, and the abscissae of which indicate flow of material through the valve in, for example, pounds per hour. In adjusting the valve body 169 to a new position, the set screw 198 is loosened and the rod 192 may be moved to the desired position by an operating knob 201 fastened to the rod. The relationship between the valve body 169 and the indicator 199 and chart 200 may be adjusted by the nut 193 and hand wheel 195, so as, for example, to bring the indicator 199 to zero abscissa when the valve body 169 is in closed position.

Since the rods 192 of the respective means 185, 186 for operating the valve bodies 168, 169 are offset from the central plane of the apparatus, as may be seen in Figure 2, the arm 187 of the means 185 is bent to the left and the arm 187 of the means 186 is bent to the right (see also Figure 11).

Means is provided to urge the valve bodies 168, 169 axially toward each other, so that the end faces 176 of the valve bodies will be held in engagement, this means being here shown as a tension spring 202 the ends of which engage projections 203 on the arms 187 respectively.

The arms 187 extend to their respective valve bodies 168, 169 through a recess 204 provided in the upper part of the plate 112a, which accommodates the arms in moving from the full line position shown in Figure 8 to the dotted line position there shown in which the feed valve means is fully open, the surface 164 being then substantially parallel to the surface 167. In this position the surface 164 and a plane surface 205 provided on the bearing member 178 define a common plane.

The plate 112a is here shown as having an upper end portion 206 bent upwardly forming a flange bearing against the underside of the plate 179.

The bearings 107, 108 for the shaft 106 of the feed screw 77 comprise a packing gland 207 and packing 208, as seen in Figure 12; and fastened by set screws 209 to each end of the shaft 106 is a thrust collar 210 which may carry a cylindrical guard 211 disposed about packing 212 between the collar and bearing member. Grease cups 213 may be provided.

Referring now to Figure 14, this shows, among other things, a section of the positive electrode 123a and one of its supporting insulators 124a. However, the construction of the positive electrodes 123 (a through h) and the supporting and adjusting means therefor is the same and therefore a description of these parts for the zone A will serve for all.

The positive electrode 123a is in the present embodiment an elongated rectangular metallic plate (see also Figure 4) extending almost the entire width of the chute 111a leaving only suitable clearance between the ends of the electrode plate and the glass plates 121a, 122a. The electrode 123a is elongated horizontally so that a wider stream or several streams of material may be treated thus increasing the capacity and flexibility of the apparatus, and it is made of considerable extent collateral to the downward dimension of the negative electrode for several reasons, among which are, that the electrostatic field is not concentrated at the discharge edge 143a of the negative electrode. Furthermore, by having the negative electrode tilted so that the particles slide down the negative electrode and at the same time subjecting them to an electrostatic field, the particles are under the influence of the field a considerable distance and a considerable time before they reach the vicinity of the discharge edge 143a. Furthermore, it will be noted that the electrostatic field between the electrodes extends at a downward angle with respect to the horizontal and, more particularly, the downward direction of the field is in the direction of downward sliding movement of the stream of particles on the negative electrode, which provides a separating action hereinafter described. Desirably, the distance which the field extends in the downward direction over the path of movement of the particles on the negative electrode is relatively great with respect to the length of the lines of force of the field, or, in other words, with respect to the distance between the electrodes.

The electrode 123a, as here shown, extends not only over the negative electrode 112a but also beyond the discharge edge 143a, and also over the gap between the discharge edge 143a of the negative electrode and the entrance edge 127a of the tails hopper. This improves the separating and segregating action as will appear.

The electrode 123a is supported by any suitable number of insulators 124a, in this instance three, spaced longitudinally of the electrode. The insulators 124a may be of hollow conical form fastened by a plurality of circumferentially spaced screws 214 disposed through an annular metal cup 215 and through a base flange 216 of the insulator to an elongated insulating plate 217 (see also Figure 4). The electrode 123a is here shown as fastened to the plate 217 in slightly spaced relation therewith by insulating buttons 218 and screws 219 extending through the electrode 123a into threaded recesses in the buttons. The buttons 218 have lateral recesses 220 in which the margins of the insulating plate 217 fit. Margins 221 of holes in the electrode 123a through which the screws 219 extend are flared to accommodate the heads of the screws so that the tops of the heads are flush with the under side of the electrode.

The insulator 124a is supported by a metal rod 222 having a collar 223 and a reduced extension 224 disposed through a hole 225 in the top of the insulator, the end of the extension being threaded and cooperating with a nut 226, whereby the rod is fastened to the insulator. Disposed and held between the collar 223 and the top of the insulator 124a is an insulating guard 227.

The rod 222 is slidable freely through a hole 228 passing transversely through a hollow shaft 229, and the rod also extends slidably through a hole 230 in a boss 231 welded to the shaft 229. The rod 222 has threads 232 along a desired part of its length and this threaded part cooperates with a threaded hand wheel 233, by rotation of which the rod may be adjusted generally upwardly or downwardly. The distance the positive electrode 123a is from the negative electrode 112a may be gaged by the amount the end of the rod 222 extends beyond the hub of the hand wheel 233, or if desired, the rod may be provided with graduations (not shown) for that purpose.

The ends of the hollow shaft 229 fit rotatably in bearings 234 forming parts of support brackets 235. The details of one of these brackets 235 may be best seen in Figures 14 and 4. The bracket 235 there seen is fastened by bolts and nuts 236 to the angle bar standard 58, lugs 237 being provided on the bracket, the lugs engaging a margin of the standard. A set screw 238 threaded into a boss on the bearing member 234 is adapted to engage the shaft 229 to hold it in adjusted position. Collars 239 are provided, pinned or otherwise fastened to the ends of the collar 229 to limit endwise movement of the shaft in the bearing members 234. The bracket 235 has an arcuate end surface 240 (see also Figure 3), the center of the arc being coincident with the axis of the shaft 229, and graduations are provided on the arcuate surface, a pointer 241 on an arm 242 being adapted to cooperate with the graduations. A reduced end of the arm 242 extends through the shaft 229 and a nut 243 is threaded on the reduced end and holds the arm fastened to the shaft.

It will be evident that by loosening the set screws 238 and moving the arm 242 the shaft 229 may be rotated in the bearings 234, whereby the positive electrode 123a may be adjusted so that the plane defined thereby may be either parallel to the negative electrode 112a or make some other desired angle with respect thereto.

The londitudinal margins of the plate forming the electrode 123a may be edged with rubber 244 or other suitable insulating material. The lower longitudinal margin of the electrode 123a may have fastened thereto, as by screws 245 an elongated insulating baffle plate 246.

The positive electrode 123a may be connected to a source of high electric potential (not shown) by terminal means 247a. The terminal means 247a comprises a metallic support 248 for a pair of jacks or sockets 249, 250 (Figures 4 and 13) for receiving plug contacts provided on the ends of insulated conductors 251, 252. The jack support 248 has a flange 253 held, as by screws 254 or the like, to the insulating plate 217; and held between the flange 253 and the plate 217 is a resilient contact member 255 having a portion 256 engaging the upper surface of the positive electrode 123a.

The conductor 252 is a jumper of general U-shape having a plug on one end inserted in the jack 250 of the terminal means 247a and a plug on the other end in a jack on the terminal means 247b of the next lower positive electrode 123b (see Figure 1). In like manner, as shown in Figure 1, there is a jumper conductor 252 connecting the terminal means of each of the other positive electrodes respectively to the next lower positive electrode. The conductor 251 leads to the source of high potential, so that, in the instance described, when the conductor 251 is connected to the source, all of the positive electrodes, of all of the treating zones, are connected to the same source and are at the same potential. However, the connections may be such that the positive electrodes have different potentials impressed thereon, if desired. The jumpers 252 may be supported at their intermediate portions, if desired, by clamps 256 in turn supported by a conduit 257, the inside of the conduit serving to carry conductors (not shown) for supplying the motors 76, 90, 96.

Referring again more particularly to Figure 14, the intermediate hopper 52a has a vertical wall 258 the upper margin 259 of which is here shown as bent over and as hanging on the bent-over margin 260 forming the entrance margin 127a of the tails hopper 50a. The intermediate hopper 52a has another vertical wall 261 an upper portion 262 of which is here shown as bent to the horizontal and as fastened by bolts and nuts 263 to a lower portion 264 of the negative electrode plate 112a also bent to the horizontal. The intermediate hopper 52a has bottom walls 265, 266 one of which, 266, extends at a somewhat steeper angle downwardly than the negative electrode 112b of the zone B and the other of which, 265, extends at an angle to the wall 266. The walls 265, 266 merge in an arcuate portion 267 in which are provided a series of apertures 268 (see also Figure 5), in this instance of oblong rectangular shape. The intermediate hopper 52a is as long as the width of the negative electrode 112b and has vertical end walls 269, 270 overlapped by portions 271b of the side walls 116b, 117b, respectively, of the chute of the zone B, these side walls being reduced in thickness where they overlap as shown in Figures 5 and 17 for example. As may be seen in Figure 17, the side walls 116a, 117a (as well as the similar side walls of the chutes of all of the treating zones) have their lower marginal portions 273a of reduced thickness thereby forming shoulders 274a which engage the top of the electrode 112a. Since all of the negative electrodes are of the same width, lower ends of the portions 273a also overlap and are in engagement respectively with the end walls 269, 270 of the intermediate hopper 52a. The walls 269, 270 have upper corner portions cut away leaving margins 285 in the plane of the negative electrode 112a, so that the margins seat against the shoulders 274a of the side walls 116a, 117a respectively. The portions 273a terminate in transverse margins 275 near the dividing means 144a, those portions of the side walls 116a, 117a which extend downwardly from the margins 275 into the tails hopper 50a having lower margins 276 which rest on the upper edge of the bent-over part 259.

Fastened by bolts and nuts 277 to the under side of the bottom wall portion 266 of the intermediate hopper 52a is a plate 278 constituting an auxiliary chute for receiving material discharged through the apertures 268 in the bottom of the intermediate hopper. The chute plate 278 is here shown as having a beveled surface 279 which if desired may rest on the upper surface of the negative plate 112b. Discharge of material from the chute plate 278 onto the negative electrode 112b is controlled by the automatic valve means 145b as will fully appear.

Considering now the dividing means or plate 144a shown most fully in Figures 5 and 14 through 16, this plate is so mounted that it may be adjusted up and down, in contact with the inner surface of the wall 258 of the intermediate hopper 52a, so that the upper margin 280 of the plate may be adjusted with respect to the plane defined by the negative electrode 112a. The upper marginal portion of the plate 144a is here shown as having a bevel surface 281 slanting downwardly from the margin 280 towards the tails hopper bottom 128a, the margin 280 being thus of knife edge character. The bottom margin of the plate 144a may be beveled to accommodate the wall 266 when the plate 144a is adjusted to its lowermost position. The body of the plate 144a extends the full length of the inside of the intermediate hopper 52a except for a desired clearance for free movement (see Figures 5 and 15). The plate 144a has a pair of ears 282 (Figures 15 and 16) at its ends, these ears extending through slots 283 in the side walls 116a, 117a respectively of the chute 111a. To permit full downward movement of the plate 144a, the walls 269, 270 have recesses 284 to accommodate the ears 282. The glass plates 121a, 122a are provided with suitable recesses 286 clearing the slots 283.

Fastened by bolts and nuts 287 to the ears are U-clamps 288 to each of which is welded or otherwise fastened a downwardly extending rod 289. The rods 289 are provided with threads 290 at their lower ends and pass freely through transverse apertures through the arms 291 of clevises 292 having threaded shanks fastened by nuts 293 to the flanges 113b, 114b of the negative electrode 112b. Disposed between the arms 291 of each clevis and cooperating with the threads 290 on the rods 289 are threaded knurled wheels 294 by rotation of which the rods and hence the plate 144a may be raised or lowered. Pointers 295 carried by the ears 282 and cooperating with graduated plates 296 respectively are provided to indicate the position of the upper margin 286 of the plate 144a. While the dividing means 144a has been described with special reference to the zone A it will be understood that all of the dividing means 144 (a through g) are of the same construction.

The automatic valve means 145b is shown most fully in Figures 14, 17, 18, and 19, and as a matter of convenience this valve means, 145b, will be described, but it will be understood that all of the automatic valve means 145 (b through g) are of the same construction. The valve means 145b comprises a swingable plate or gate 297 the lower portion of which is coextensive with the auxiliary chute plate 278. When the valve means is in closed position, as shown in the drawings, the gate 297 is approximately at right angles to the chute plate 278 and the upstream surface of the gate is in engagement with a pair of stop pins 298 suitably fastened to and projecting upwardly from the auxiliary chute plate. In the closed position the lower beveled margin 299 of the gate 297 clears the surface of the chute plate 278. The amount of clearance may be a desired amount larger than the size of the particles treated so that when the gate 297 is against the stop pins 298 a very thin film of particles may pass, but in any event, for any position of the gate 297, one of the functions of the automatic valve means of which the gate 297 is a part is to bring the particles to rest before they are fed to the succeeding treating zone, as will more fully appear.

The upper portion of the upstream face of the gate 297 bears against and is fastened, as by screws 300, to a surface of a square section rod 301. The rod 301 has welded or otherwise fastened to its ends, arms 302, the gate having right angle recesses 303 (one of which may be seen in Figure 19) to accommodate the respective arms 302. Screwed into threaded holes in the arms are screw bolts 304 respectively held in desired position by jam nuts 305. Each screw bolt 304 has an inverted V-shaped axially extending recess 306 which as here shown is formed in the head of the bolt and extends into a part of the shank thereof. The recesses 306 are adapted to cooperate respectively with knife edge portions 307 formed on the ends of headless screws 308. The screws 308 are in threaded engagement respectively with threaded holes in a pair of brackets 309 welded or otherwise suitably fastened to the wall 265 of the intermediate hopper 52a, the outer surfaces of the brackets 309 being respectively flush with the end walls 269, 270 of the hopper. The screws 308 are held in desired position by jam nuts 310 bearing against the brackets 309. The ends of the gate are provided with right angle recesses 311 for purposes of clearance of the supporting parts.

As here shown the axes of the screw bolts 304 are in the plane defined by the upstream surface of the gate 297 and the upper margins 312 of the knife edges 307 are in the median or general plane of the gate 297.

The gate 297 is biased toward closed position by weights 313 disposed at the outside of the chute walls 116b, 117b respectively, the weights being adjustably held on depending rods 314 by set screws 315, the rods being suitably fastened transversely to members 316 having holes 317 adapted respectively to receive the outer ends of horizontal rods 318 which extend inwardly through apertures 319 (see also Figure 15) in the side walls 116b, 117b, the other ends of the rods being inserted in transverse holes 320 in the respective arms 302 and are held in these holes by set screws 321. For the sake of clearness one of the rods 318 and the weight 313 supported thereby are broken away in Figure 17.

The apertures 319 are suitably shaped to accommodate the rods 318 when the gate 297 swings away from the stops 298. The screws 308 also extend through the apertures 319 and the nuts 310 are accessible from the outside of the walls 116b, 117b.

It will be apparent that with the weights 313 in any given like position on the rods 314 the effective moment arm on which the weights act to hold the gate 297 against the stops 298 will be a line normal to the line defined by the knife edge margins 312 to a vertical plane through the center of gravity of the weights. Since the distance of a vertical plane through the center of gravity of the weights 313 from the line defined by the knife edge margins 312 will increase upon opening or incipient opening of the gate 297, the effective moment arm also will increase. Obviously the amount of this increase for a given operative opening of the gate 297 may be adjusted by changing the position of the weights 313 on the rods 314, the amount of increase being less when the weights are higher on the rods than when they are lower.

Furthermore, the moment arm on which the weights 313 act when the gate 297 is against the stops 298 may be increased for any given position of the weights on the rods, by adjusting the rods so that they extend downwardly toward the left, as viewed in Figure 14, instead of vertically downwardly as shown in the drawings.

Hence, the amount of material banked up against the up-stream side of the gate 297 necessary to cause incipient opening of the gate may be selected by the proper adjustment.

By reason of the construction and arrangement of the valve means 145 (b through h), the particles are not only brought to rest before they are fed to each succeeding treating zone, but a uniform distribution of the particles over the width of the respective zone is automatically insured, as will more fully appear hereinafter in connection with the operation of the apparatus.

Referring now more particularly to Figures 20 and 21, there are here shown pipes 330 to 334 inclusive disposed through a floor 335, through which, in this instance, the elevators 64, 70 are also disposed. In the arrangement shown the flexible conduit 67 is connected to the pipe 330 which is adapted to discharge material onto the feed screw 77 at its center, whereby rotation of the feed screw 77 (counterclockwise as seen in Figure 20, or Figure 3, for example), causes the material to be moved from the center of the feed hopper 63 in opposite directions toward the ends of the hopper 63. The pipes 331 through 334, hereinafter further described, are here shown as closed by caps 330. These pipes, as well as the elevator 76, are not in use in the feed arrangement shown in Figures 20, 21.

Assuming now that material is being fed to the hopper 83 as shown in Figures 20 and 21, and assuming further that the valve bodies 168, 169 of the valve means 110 are open equal amounts, material will fall through the apertures 109 and thence through the open valve means 110 onto the negative electrode 112a down which the material will slide as a stream of particles, the stream being comparable to a film or sheet of a thickness depending upon the amount of opening of the valve means 110, the sheet being of uniform thickness and extending over substantially the entire width of the electrode 112a.

The positive electrodes will be subjected to a desired high potential and will be so spaced by adjustment with respect to the respective negative electrodes, that, for a given material to be treated, the susceptible or more susceptible component particles will be influenced to the desired extent.

In the free space directly between the positive electrode 123a and the negative electrode 112a, the lines of force of the electrostatic field are parallel to each other and normal to the respective electrodes, and the electrostatic field as a whole extends downwardly at an angle to the horizontal, even if the plane of the positive electrode 123a, within the limits of desired operative adjustment, is not parallel to the plane of the negative electrode 112a. The latter may be the case if for any reason it is desired that the intensity of the electrostatic field be less in its upper portion than in its lower portion, or vice versa.

As the stream of particles slides under the insulating baffle 138a, susceptible particles that might rise in the fringe field extending from the upper margin of the positive electrode 123a, are kept by that baffle from getting on top of the electrode 123a, and such particles fall back on the negative electrode and eventually continue with the stream thereon. When the stream on the negative electrode 112a gets into the free field between the positive and negative electrodes, susceptible particles rise into the electrostatic field and since this field extends downwardly at an angle to the horizontal and the force of gravity is at the same time acting on the particles and also influences their direction of movement in suspension in the field, as soon as any particle leaves the negative electrode, these susceptible particles do not rise in a direction upwardly at right angles to the negative electrode but tend to move toward a lower portion of the field considered as a whole. Some of the particles may reach the positive electrode, be charged positively, and fall back on the negative electrode at a lower level; others may make a downward flight in the field without reaching the positive electrode, and again land on the negative electrode from which they may again make a downward flight in suspension in the field eventually passing over the top of the dividing plate 144a into the tails hopper 50a; and others may go into suspension in the field and make a single downward flight in the field, over the dividing plate 144a and into the tails hopper 50a. A large number of susceptible particles may be making flights in the field at one time, so that this mass of particles may be likened to a downwardly rolling cloud of particles. Those particles which are in flight at and above the dividing plate 144a of course land in the tails hopper 50a. Carrying of suspended particles or particles in flight over the dividing plate 144a into the tails hopper is promoted by the fact that the electrode 123a extends over the gap between the edges 143a, 127a and so provides a suitable electrostatic field beyond the discharge edge 143a. The remaining particles, which are the heads as far as the zone A is concerned, fall off of the margin 143a of the negative electrode, or hit the upstream face of the dividing plate 144a, and these particles of course enter the intermediate hopper 52a.

Any susceptible particles which have passed over the dividing plate 144a and which might undesirably rise in the fringe electrostatic field between the lower margin of the electrode 123a and the wall 128a of the tails hopper, strike the baffle 246 and fall back into the tails hopper out of range of the field.

The particles which enter the intermediate hopper 52a are discharged through the apertures 268 and come to rest against the gate 297 of the automatic valve means 145b, or against particles banked at the clearance space between the lower margin of the gate and the chute plate 278. A very thin uniform film of particles may pass from the bank of particles through the clearance space even when the gate 297 is against the stop pins 298. When a sufficient amount of particles is banked up against the gate 297, the gate opens a certain amount. Meanwhile particles are being continuously discharged from the intermediate hopper 52a, replenishing the bank of particles against the gate 297, so that for a given discharge rate from the hopper 52a a balance will be reached when the gate 297 is open a certain amount, particles being continuously discharged through the gate onto the chute plate 278 and thence onto the negative electrode 112b of the zone B in a sheet of uniform thickness.

The rate of discharge from the intermediate hopper 52a depends of course upon the rate at which particles enter the hopper from the zone A and this in turn depends, for one thing, upon the initial flow rate permitted by the feed valve means 110. A change in the adjustment of the feed valve means 110 resulting in a different flow rate into and from the intermediate hopper 52a will result in automatic adjustment of the gate 297 to a new position. Furthermore, for a given adjustment of the feed valve means 110, the rate of flow into and from the intermediate hopper 52a depends upon the amount of susceptible particles extracted from the sheet of particles flowing down the electrode 112a of the zone A. Since susceptible particles are extracted from the sheet of particles flowing down the electrode 112a it will be evident that the rate of discharge from the intermediate hopper 52a will be less than the rate of discharge through the feed valve means 110, but the valve means 145b automatically adjusts for this difference so that while the volume or flow rate from the valve means 145b will be less than from the feed valve means 110, the particles are distributed over the width of the zone B in a sheet of uniform thickness though of less thickness than in the zone A. Thus, if for any reason, the rate of discharge from the intermediate hopper 52a changes, the valve means 145b automatically adjusts for the change.

The actions hereinbefore described in connection with the zone A also take place in all of the subsequent zones B through H. In each zone susceptible particles are separated from the streams of particles on the respective negative electrodes, and the "heads" from each zone (except the zone H) enter an intermediate hopper, the heads from the zone H landing in the main or final heads hopper 53. Between each two successive zones the particles of material are brought to rest, by reason of the action of the respective automatic valve means 145, before continuing into the following treating zone, thereby preventing progressive velocity increase and preventing mechanical action of the particles such as results from bouncing and collision of the particles. By preventing any one or more of these undesirable effects a better separating action is secured.

It will be apparent that while the velocities of the flowing sheets of particles in successive treating zones are substantially equal, the volumes in successive treating zones progressively decrease when susceptible particles are extracted from each treating zone, but each automatic valve means 145 (b through h) insures uniform distribution of the particles over the width of the respective treating zone by automatically suitably closing down when a decreased volume flows to a given automatic valve means 145 but still maintaining a thin sheet of particles distributed over the width of the respective zone. In general, the automatic valve means 145 (b through h) insure uniform distribution of the particles over the width of the respective treating zones whatever the flow rate from one zone to the next succeeding zone may be.

In general, it will be apparent that with the apparatus hereinbefore described, the feeding of particles into the successive treating zones is automatically controlled. Excessive velocity is avoided, and in the disclosed instance the velocities of the streams of particles in successive treating zones is substantially equal. At the same time, the feeding of particles into each treating zone is so controlled that the stream of particles fed into any given zone, for any given rate of flow into the zone, is a stream of uniform thickness across the width of the given treating zone. Furthermore, undesired or excessive stream thickness is prevented.

Assuming that the feed screws 82, 83, and 91 all are rotated clockwise as viewed from the right hand end of Figure 23, this being indicated by the curved arrows at the ends of the feed screws, the heads and tails will be discharged at the right, as viewed in Figure 23, the heads being discharged from the spout 161 of the heads hopper (the spouts 163 being suitably capped), and the tails being discharged from the spouts 160g, 160h of the tails hoppers 52g, 52h respectively. The course of the material is diagrammatically indicated in Figures 22 and 23, it being also noted that in order to clearly show the course of the material in Figure 23 the feed screw 91 has been shown at a level higher than the feed screw 83 and the elevators 64, 70 have been offset from the center line.

In Figures 22 and 23 (as well as in Figures 24 through 26, hereinafter described) the raw material fed to the feed screw 77 and distributed thereby to the separating apparatus is indicated by heavy full lines. These heavy full lines are shown as separating into tails and heads, the tails being indicated by light full lines and the heads by dotted lines. It will be understood that the diagram Figure 23 merely serves to show the origin of the heads and tails and where they are finally discharged. Accordingly it may be said that when the set-up is as shown in Figures 20 and 21 and rotation of the feed screw is as hereinbefore described, then both the heads and tails are discharged at the right hand end of the apparatus as viewed in Figure 23.

In Figures 24 through 26 the raw material-feed set-up is the same as shown in Figures 22 and 21 and the feed screw 77 is also rotated clockwise, as indicated by the curved arrow at the right hand end of the screw 77, but these figures differ from Figure 23 in the following respects.

In Figure 24 the feed screws 82, 83 are indicated by the curved arrows as rotating counter-clockwise as viewed from the right hand end, whereas the feed screw 91 is indicated as rotating clockwise. Therefore the heads are discharged, as before, from the spout 161 at the right whereas the tails are discharged from the spouts 160g, 160h at the left.

In Figure 25 the feed screws are indicated as all rotating counterclockwise, so that both the heads and tails are discharged at the left hand end of the apparatus.

In Figure 26 the feed screw 91 is indicated as rotating counterclockwise and the feed screws 82 and 83 are indicated as rotating clockwise, so that the heads are discharged from the spout 161 at the left, and the tails are discharged from the spouts 160g, 160h at the right.

In all of Figures 24, 25, and 26 the spouts 163 remain capped.

In the set-ups shown in Figures 21 through 26 it will of course be evident that the material which is discharged from the heads hopper 53 has passed through all of the treating zones, in this instance eight. However, the material may be caused to pass through the treating zones more than once, twice for example, so that the material which is finally discharged from the heads hopper, in the illustrated apparatus, has passed through the equivalent of sixteen treating zones. The principle of passing and re-passing the material through the treating zones is of course not limited to any particular number of zones. One set-up for causing re-passing of the material is shown in Figures 27 and 28.

Referring first to Figure 27. The pipe 330 is here shown as capped and the pipe 334 is uncapped and has the conduit 67 connected thereto. The pipe 331 is uncapped and has the conduit 72 connected thereto, the elevator 70 being in operation in this set-up. Thus material from the elevator 64 is fed to the left hand end of the screw 77, as viewed in Figure 28. Accordingly, the feed screw is indicated, by the curved arrow, as rotating in a counterclockwise direction as viewed from the right side of Figure 28, so that the material fed to the screw 77 at its ends is urged in opposite directions toward the middle. Considering first the raw material feed indicated by the heavy full line 339 in Figure 28. This feed forms a stream, in the right hand half of the apparatus as viewed in Figure 28, in the form of a sheet or film having a width one-half that of the width of the negative electrodes 112 (a through h) of the treating zones and the separating action for removal of susceptible particles in the successive treating zones is the same as described in the instances where the raw material stream extends over the entire width of the negative electrodes. The tails resulting from this stream are indicated by the light full lines 340 and these tails are carried by the feed screws 82, 83 to and discharged from the spouts 160g, 160h at the left as viewed in Figure 28, the feed screws 82, 83 rotating counterclockwise as indicated by the curved arrows. The heads resulting from this raw material stream are indicated by the dotted line 341 and these heads are carried by a feed screw 911 to the right hand spout 163, now uncapped. The right hand spout 161 may be capped. The feed screw 911 replaces the feed screw 91 in this arrangement of the apparatus and the feed screw 911 instead of being of the same hand throughout its length as is the feed screw 91, is right handed in one-half its length and left handed in the other half, like the feed screw 77. In the set-up shown in Figure 28 the feed screw 911 is rotated, as indicated by the curved arrow, clockwise as viewed from the right of Figure 28.

The heads discharged from the spout 163 are led, by means of a suitable conduit (not shown) to the inlet spud 73 of the elevator 70, are elevated and fed through the pipe 331 to the left hand end of the feed screw 77. This feed, indicated by the part 341r of the dotted line, though it is heads from a first pass through the apparatus, in effect constitutes the raw material for the left hand part of the feed screw 77. The feed 341r forms a stream, in the left hand half of the apparatus as viewed in Figure 28, in the form of a sheet or film having a width one-half that of the width of the negative electrodes of the treating zones, and the separating action for removal of susceptible particles in the successive treating zones is the same as for the stream in the right hand half of the apparatus. It may be noted that the thickness of the initial stream from the feed 339, and the thickness of the initial stream from the feed 341r, onto the electrode 112a, may be controlled independently by adjustment of the valve bodies 168 and 169 respectively. The tails resulting from the feed 341r, indicated by the light full lines 342 are carried by the feed screws 82, 83 to and discharged from the spouts 160g, 160h along with the tails coming from the right hand halves of these feed screws. The heads resulting from the feed 341r, indicated by the dot and dash line 343, are carried to and discharged from the left hand spout 161 (the left hand spout 163 being capped). Thus, in the illustrated apparatus, in the set-up hereinbefore described, the heads finally discharged from the heads hopper have been treated in sixteen passes.

The set-up shown in Figure 29 is the same as that shown in Figures 27 and 28 except that the feed screws 82, 83 are rotated clockwise, whereby the tails are discharged from the spouts 160g, 160h at the right, the heads still being discharged from the spout 161 at the left.

Referring to the set-up shown in Figure 30. The pipes 330, 331, and 334 are here shown as capped and the pipe 332 is uncapped and has the conduit 67 connected thereto. The pipe 333 is uncapped and has the conduit 72 connected thereto, the elevator 70 also being in operation in this set-up. Thus material from the elevator 64 is fed to the left hand end of the screw 77 and material from the elevator 70 is fed to the right hand end of the screw 77, as viewed in Figure 30. The feed screw 77 is indicated, by the curved arrow, as rotating in a counterclockwise direction as viewed from the right side of Figure 31, so that the material fed to the screw 77 at its ends is urged in opposite directions toward the middle. The raw material feed, indicated by the heavy full line 349 in Figure 31, forms a stream, in the left hand half of the apparatus as viewed in Figure 30, in the form of a sheet or film having a width one-half that of the width of the negative electrodes 112 (a through h) of the treating zones and here again the separating action for removal of susceptible particles in the successive treating zones is the same as described in the instances where the raw material stream extends over the entire width of the negative electrodes. The tails resulting from this stream are indicated by the light full lines 350 and these tails are carried by the feed screws 82, 83 to and discharged from the spouts 160g, 160h at the left as viewed in Figure 31, the feed screws 82, 83 rotating counterclockwise as indicated by the curved arrows. The heads resulting from this raw material stream are indicated by the dotted line 351 and these heads are carried by a feed screw 911 to the left hand spout 163, now uncapped. The right hand spout 163 may be capped, and the left hand spout 161 may be capped. In the set-up shown in Figures 30, 31, the feed screw 911 is rotated, as indicated by the curved arrow, clockwise as viewed from the right of Figure 30.

The heads discharged from the spout 163 are led, by means of a suitable conduit (not shown) to the inlet spud 75 of the elevator 70, are elevated and fed through the pipe 333 to the right hand end of the feed screw 77. This feed, indicated by the part 351r of the dotted line, in effect constitutes the raw material for the right hand part of the feed screw 77. The feed 351r forms a stream, in the right hand half of the apparatus as viewed in Figure 30, in the form of a sheet or film having a width one-half that of the width of the negative electrodes of the treating zones, and the separating action for removal of susceptible particles in the successive treating zones is the same as for the stream in the left hand half of the apparatus. Here, too, the thickness of the initial stream from the feed 349, and the thickness of the initial stream from the feed 351r, onto the electrode 112a, may be controlled independently by adjustment of the valve bodies 168 and 169 respectively. The tails resulting from the feed 351r, indicated by the light full lines 352 are carried by the feed screws 82, 83 to and discharged from the left hand spouts 160g, 160h along with the tails coming from the right hand halves of these feed screws. The heads resulting from the feed 351r, indicated by the dot and dash line 353, are carried by the right half of the feed screw 911 to the right hand spout 161. Thus, in the illustrated apparatus, the heads finally discharged from the heads hopper, in this set-up also, have been treated in sixteen passes.

The set-up shown in Figure 32 is the same as that shown in Figures 30 and 31 except that the feed screws 82, 83 are rotated clockwise, whereby the tails are discharged from the spouts 160g, 160h at the right, the heads still being discharged from the spout 161 at the right.

From the foregoing it will be apparent to those skilled in the art that each of the illustrated embodiments of apparatus provides a new and improved apparatus accomplishing the principal objects of my invention. On the other hand, it also will be obvious to those skilled in the art that the illustrated apparatus embodying my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. Apparatus for electrostatic separation of material particles, comprising: first plate type electrode means for supporting a stream of particles moving on said electrode means to a discharge edge thereof; first receiving means for receiving particles falling from said first electrode means over said discharge edge; second receiving means, having a portion extending to an edge spaced from said discharge edge, constructed and arranged to receive particles moving across said space; second plate type electrode means, disposed above said first electrode means, constructed and arranged to subject said stream to an electrostatic field; and insulating baffle means extending from said second electrode means over said portion.

2. Apparatus for electrostatic separation of material particles, comprising: first plate type electrode means for supporting a stream of particles moving on said electrode means from a place of origin on said electrode means to a discharge edge thereof; receiving means for receiving particles falling from said first electrode means over said discharge edge; second plate type electrode means, disposed above said first electrode means, constructed and arranged to subject said stream to an electrostatic field; and insulating baffle means above said first electrode means and interposed between said place of origin and the adjacent margin of said second electrode means.

3. Apparatus for electrostatic separation of material particles, comprising: first plate type electrode means disposed at an angle to the horizontal; second plate type electrode means above said first electrode means; and means supporting said second electrode means, including a rotatably mounted shaft, means adjustably holding said shaft in a selected rotative position, a threaded rod extending freely through a transverse aperture in said shaft, means whereby said second electrode means is carried by said rod, and means, including a nut cooperating with said threaded rod, constructed and arranged to adjust said rod with respect to said shaft.

4. Apparatus for electrostatic separation of material particles, comprising: an electrostatic treating zone; means, including horizontally elongated hopper means, means for feeding particles into said hopper means, and feed screw means in said hopper means, so constructed and arranged that particles fed to said hopper means are distributed between the ends of said hopper means by said screw means and caused to enter said zone in generally parallel streams disposed between said ends and a place intermediate said ends; means for separately controlling the rate of flow of said streams and means for segregating electrostatically susceptible particles removed from said streams by the action of said treating zone.

5. Apparatus for electrostatic separation of material particles, comprising: means for causing a stream of particles to descend by gravity successively through a plurality of electrostatic treating zones wherein susceptible particles are removed and segregated from said stream; means for feeding particles to the first of said treating zones at a selected rate; and automatic valve means, interposed between successive treating zones, constructed and arranged automatically to adjust the thickness of the stream of particles fed to the succeeding treating zone dependent upon said selected rate and the rate of removal of susceptible particles from the preceding zone.

6. Apparatus for electrostatic separation of material particles, comprising: means for causing a stream of particles to descend by gravity successively through a plurality of electrostatic treating zones wherein susceptible particles are removed and segregated from said stream; means for feeding particles to the first of said treating zones at a selected rate; and automatic valve means, interposed between successive treating zones, constructed and arranged automatically to adjust the thickness of the stream of particles fed to the succeeding treating zone so that the particles are uniformly distributed over the width of said zone for any selected rate of feed to the first zone.

7. Apparatus for electrostatic separation of material particles, comprising: means providing a plurality of electrostatic treating zones wherein susceptible particles are removed and segregated from said stream, each zone comprising inclined plane means on which particles are caused to descend by gravity, and each zone comprising means for subjecting particles to an electrostatic field extending over substantially the major portion of the path of descent of the particles; means for feeding particles to the first of said treating zones at a selected rate; and automatic valve means, interposed between successive treating zones, constructed and arranged to bring particles to rest before entering the succeeding treating zone and automatically to adjust the thickness of the stream of particles fed to said succeeding treating zone so that the particles are uniformly distributed over the width of said zone for any selected rate of feed to the first zone.

8. Apparatus for electrostatic separation of material particles, comprising: means for causing particles to descend by gravity successively through a plurality of electrostatic treating zones; and means, including swingable gate means responsive to the weight of particles banked against the upstream side thereof, interposed between successive treating zones, constructed and arranged to bring particles to rest before feeding them to the succeeding treating zone and causing said particles to be uniformly distributed over the width of the succeeding treating zone for any given rate of feed.

9. Apparatus for electrostatic separation of material particles, comprising: an electrostatic treating zone; means, including horizontally elongated hopper means, first means for feeding particles into one end of said hopper means, second feeding means for feeding particles into the other end of said hopper means, and feed screw means in said hopper means, so constructed and arranged that particles fed to said hopper means are distributed between the ends of said hopper means by said screw means and caused to enter said zone in generally parallel streams disposed between said ends and a place intermediate said ends, a first of said streams being fed by said first feeding means and a second of said streams being fed by said second feeding means; means for segregating electrostatically susceptible particles removed from said streams by the action of said treating zone; horizontally elongated receiving hopper means constructed and arranged to receive said streams, said receiving hopper means having first discharge means at one end thereof and second discharge means at the opposite end thereof; screw means, in said receiving hopper means, constructed and arranged to move particles in said hopper means received from said first stream to said first discharge means and to move particles received from said second stream to said second discharge means; and means for conveying particles from said first discharge means to said second feeding means.

10. Apparatus for electrostatic separation of material particles, comprising: an electrostatic treating zone; means, including horizontally elongated hopper means, first means for feeding particles into one end of said hopper means, second feeding means for feeding particles into the other end of said hopper means, feed screw means in said hopper means, so constructed and arranged that particles fed to said hopper means are distributed between the ends of said hopper means by said screw means and caused to enter said zone in generally parallel streams disposed between said ends and a place intermediate said ends, a first of said streams being fed by said first feeding means and a second of said streams being fed by said second feeding means; means for separately controlling the rate of flow of said streams respectively; means for segregating electrostatically susceptible particles removed from said streams by the action of said treating zone; horizontally elongated receiving hopper means constructed and arranged to receive said streams, said receiving hopper means having first discharge means at one end thereof and second discharge means at the opposite end thereof; screw means, in said receiving hopper means, constructed and arranged to move particles in said hopper means received from said first stream to said first discharge means and to move particles received from said second stream to said discharge means; and means for conveying particles from said first discharge means to said second feeding means.

11. Apparatus for electrostatic separation of material particles, comprising: first plate type electrode means for supporting a stream of particles moving downwardly on said electrode means to a discharge edge theerof; receiving means for receiving particles falling from said first electrode means over said discharge edge, said receiving means having a margin leaving a first space between it and said discharge edge; and second electrode means of continuous plate type, disposed above said first electrode means and over said first space and leaving a second space between said margin and said second electrode means for particles moving in suspension underneath said second electrode means and across said first space and across said margin, said second electrode means being constructed and arranged to cooperate with said first electrode means to subject said stream to an electrostaitc field extending downwardly over substantially the major portion of the path of descent of the particles.

12. Apparatus for electrostatic separation of material particles, comprising: first plate type electrode means for supporting a stream of particles moving downwardly on said electrode means to a discharge edge thereof; first receiving means for receiving particles falling from said first electrode means over said discharge edge; second receiving means having a margin leaving a space between it and said discharge edge; and second electrode means of continuous plate type, disposed above said first electrode means and leaving a second space between said margin and said second electrode means for particles moving in suspension underneath said second electrode means and across said first space and across said margin into said second receiving means, said second electrode means being constructed and arranged to cooperate with said first electrode means to subject said stream to an electrostatic field extending downwardly over substantially the major portion of the path of descent of the particles.

13. Apparatus for electrostatic separation of material particles, comprising: first plate type electrode means for supporting a stream of particles moving downwardly on said electrode means to a discharge edge thereof; first receiving means for receiving particles falling from said first electrode means over said discharge edge; second receiving means including a metallic plate portion having a margin leaving a first space between it and said discharge edge; and second electrode means of continuous plate type, disposed over said first electrode means and over said first space and over said metallic plate portion and leaving a second space between said metallic plate portion and said second electrode means for particles moving in suspension underneath said second electrode means and across said first space and across said margin into said second receiving means, said second electrode means being constructed and arranged to cooperate with said first electrode means to subject said stream to an electrostatic field extending downwardly over substantially the major portion of the path of descent of the particles.

14. Apparatus for electrostatic separation of material particles, comprising: first plate type electrode means for supporting a stream of particles moving downwardly on said electrode means to a discharge edge thereof; receiving means for receiving particles falling from said first electrode means over said discharge edge, said receiving means including a metallic plate portion having a margin leaving a first space between it and said discharge edge; an insulating baffle extending along and upwardly from said margin; and second electrode means of continuous plate type, disposed above said first electrode means and over said first space and leaving a second space between the upper margin of said insulating baffle and said second electrode means for particles moving in suspension underneath said second electrode means and across said first space and across said upper margin of said insulating baffle, said second electrode means being constructed and arranged to cooperate with said first electrode means to subject said stream to an electrostatic field extending downwardly over substantially the major portion of the path of descent of the particles.

15. Apparatus for electrostatic separation of material particles, comprising: first plate type electrode means for supporting a stream of particles moving downwardly on said electrode means to a discharge edge thereof; first receiving means for receiving particles falling from said first electrode means over said discharge edge; second receiving means including a metallic plate portion having a margin leaving a first space between it and said discharge edge; an insulating baffle extending along and upwardly from said margin; and second electrode means of continuous plate type, disposed above said first electrode means and over said first space and over said metallic plate portion and leaving a second space between the upper margin of said insulating baffle and said second electrode means for particles moving in suspension underneath said second electrode means and across said first space and across said upper margin of said insulating baffle into said second receiving means, said second electrode means being constructed and arranged to cooperate with said first electrode means to subject said stream to an electrostatic field extending downwardly over substantially the major portion of the path of descent of the particles.

16. Apparatus for electrostatic separation of material particles, comprising: first plate type electrode means for supporting a stream of particles moving on said electrode means to a discharge edge thereof; first receiving means for receiving particles falling from said first electrode means over said discharge edge; dividing means comprising an insulating plate having an upper edge spaced from said discharge edge; means, including threaded rods carried a the ends of said insulating plate, and nuts, carried by said support means relatively stationary with respect to said insulating plate, and cooperating with said threaded rods respectively, constructed and arranged to adjust said plate vertically by rotation of said nuts; and second plate type electrode means, disposed above said first electrode means, constructed and arranged to subject said stream to an electrostatic field extending downwardly over substantially the major portion of the path of descent of the particles.

EDWIN L. WIEGAND.